(12) United States Patent
Woodward, IV

(10) Patent No.: US 12,066,037 B1
(45) Date of Patent: Aug. 20, 2024

(54) SIPHON PIPE-ROW CROP IRRIGATION SYSTEM AND METHOD

(71) Applicant: Delmar Gerald Woodward, IV, Chico, CA (US)

(72) Inventor: Delmar Gerald Woodward, IV, Chico, CA (US)

( * ) Notice: Subject to any disclaimer, the term of this patent is extended or adjusted under 35 U.S.C. 154(b) by 45 days.

(21) Appl. No.: 18/146,977

(22) Filed: Dec. 27, 2022

Related U.S. Application Data

(63) Continuation-in-part of application No. 17/482,421, filed on Sep. 23, 2021, now abandoned.

(51) Int. Cl.
*F04F 10/00* (2006.01)
*A01G 25/00* (2006.01)
*A01G 25/09* (2006.01)

(52) U.S. Cl.
CPC ............. *F04F 10/00* (2013.01); *A01G 25/00* (2013.01); *A01G 25/09* (2013.01); *Y10T 137/272* (2015.04); *Y10T 137/2747* (2015.04)

(58) Field of Classification Search
CPC ............ Y10T 137/272; Y10T 137/2747; F01F 10/00; A01G 25/09; A01G 25/00
See application file for complete search history.

(56) References Cited

U.S. PATENT DOCUMENTS

| | | | | |
|---|---|---|---|---|
| 3,921,859 A * | 11/1975 | Colombani | ............ | B22D 39/02 222/416 |
| 3,974,845 A * | 8/1976 | Indresaeter | ............ | A01G 25/09 239/731 |
| 4,035,299 A * | 7/1977 | Vroeginday | ........... | A01K 63/04 137/142 |
| 4,179,045 A * | 12/1979 | Colombani | ............... | F27D 3/14 164/63 |
| 4,190,068 A * | 2/1980 | Beusch | ................ | A01G 25/097 239/737 |
| 4,275,837 A * | 6/1981 | Baroni | ................... | A01G 25/09 239/747 |
| 4,303,092 A * | 12/1981 | Logan | ..................... | F04F 10/00 137/142 |
| 4,726,529 A * | 2/1988 | Nislar | .................... | A01G 25/09 239/536 |
| 4,858,832 A * | 8/1989 | Hundeby | ............... | A01G 25/09 239/723 |
| 5,240,383 A * | 8/1993 | Ames | ...................... | F04B 17/06 441/133 |
| 5,447,274 A * | 9/1995 | Tofin | ...................... | B05B 9/007 239/723 |
| 5,898,375 A * | 4/1999 | Patterson | ................ | C02F 3/006 200/81.9 R |
| 5,970,999 A * | 10/1999 | Greenia | .................. | F04F 10/00 137/147 |

(Continued)

*Primary Examiner* — Daphne M Barry
*Assistant Examiner* — Frederick D Soski
(74) *Attorney, Agent, or Firm* — West & Associates, A PC; Stuart J. West

(57) ABSTRACT

The main purpose in producing this innovative farming machinery is to reduce water, labor, and equipment costs associated with tradition siphon irrigation. Siphon pipes are commonly used in the agricultural industry for row crop irrigation. Traditional harvests involving this irrigation method include corn, beans, tomatoes, and alfalfa, among others. The irrigation method is commonly used throughout the United States, India, and Australia.

18 Claims, 22 Drawing Sheets

(56) References Cited

U.S. PATENT DOCUMENTS

| | | | | |
|---|---|---|---|---|
| 6,279,838 | B1* | 8/2001 | Sivells | A01G 25/09 |
| | | | | 239/146 |
| 2004/0177975 | A1* | 9/2004 | Laskaris | A62C 5/02 |
| | | | | 169/15 |
| 2007/0231070 | A1* | 10/2007 | Belford | A01G 25/09 |
| | | | | 405/36 |
| 2010/0071780 | A1* | 3/2010 | Sprague | F04F 10/00 |
| | | | | 137/123 |
| 2011/0079659 | A1* | 4/2011 | Wilken | A01M 7/0042 |
| | | | | 239/74 |
| 2015/0316076 | A1* | 11/2015 | Yoshida | F04F 10/00 |
| | | | | 137/152 |
| 2016/0309647 | A1* | 10/2016 | Bittner | A01M 7/0089 |
| 2021/0235640 | A1* | 8/2021 | LeBaron | A01G 25/097 |
| 2024/0077144 | A1* | 3/2024 | Gardiner | F04B 37/14 |

* cited by examiner

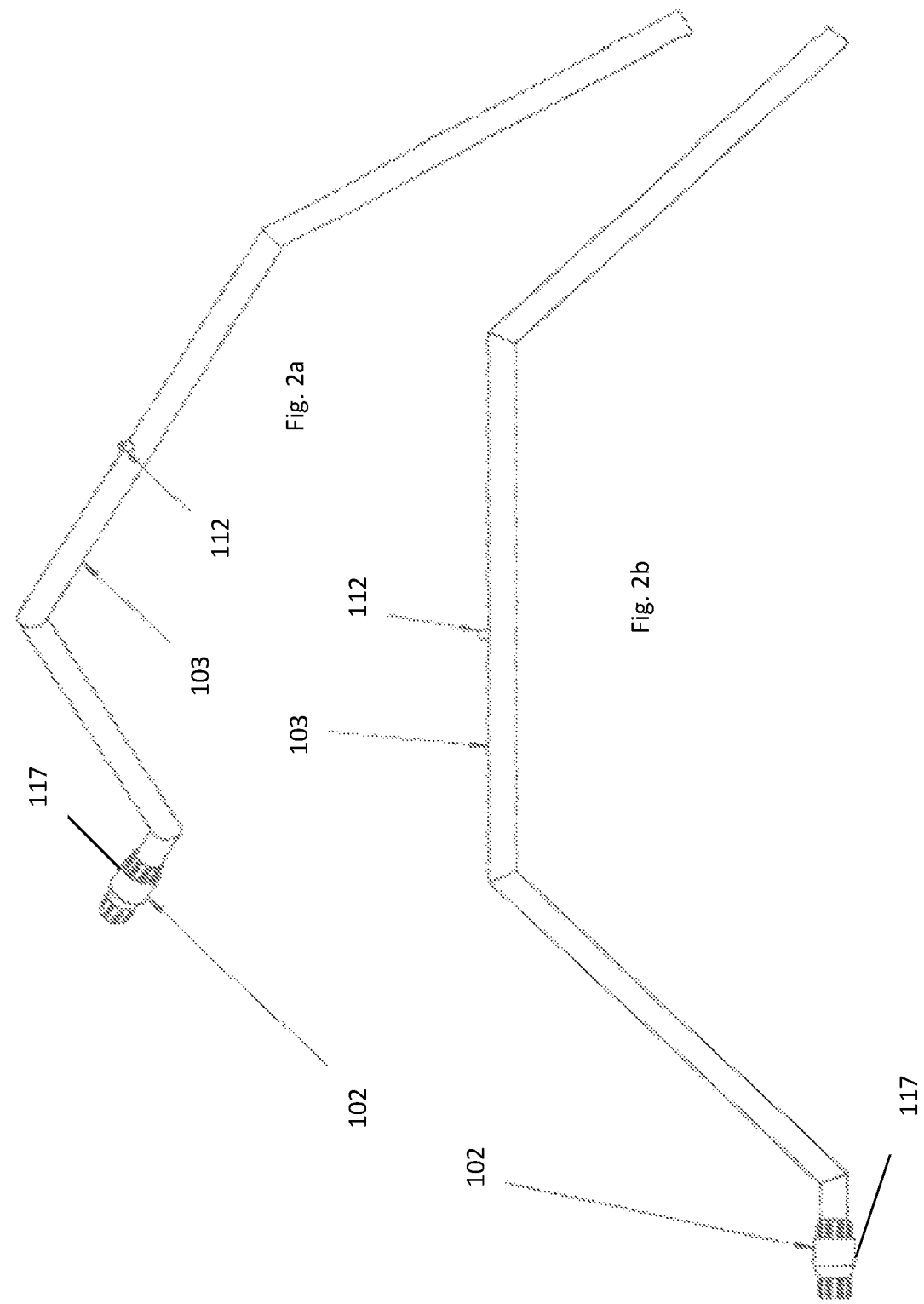

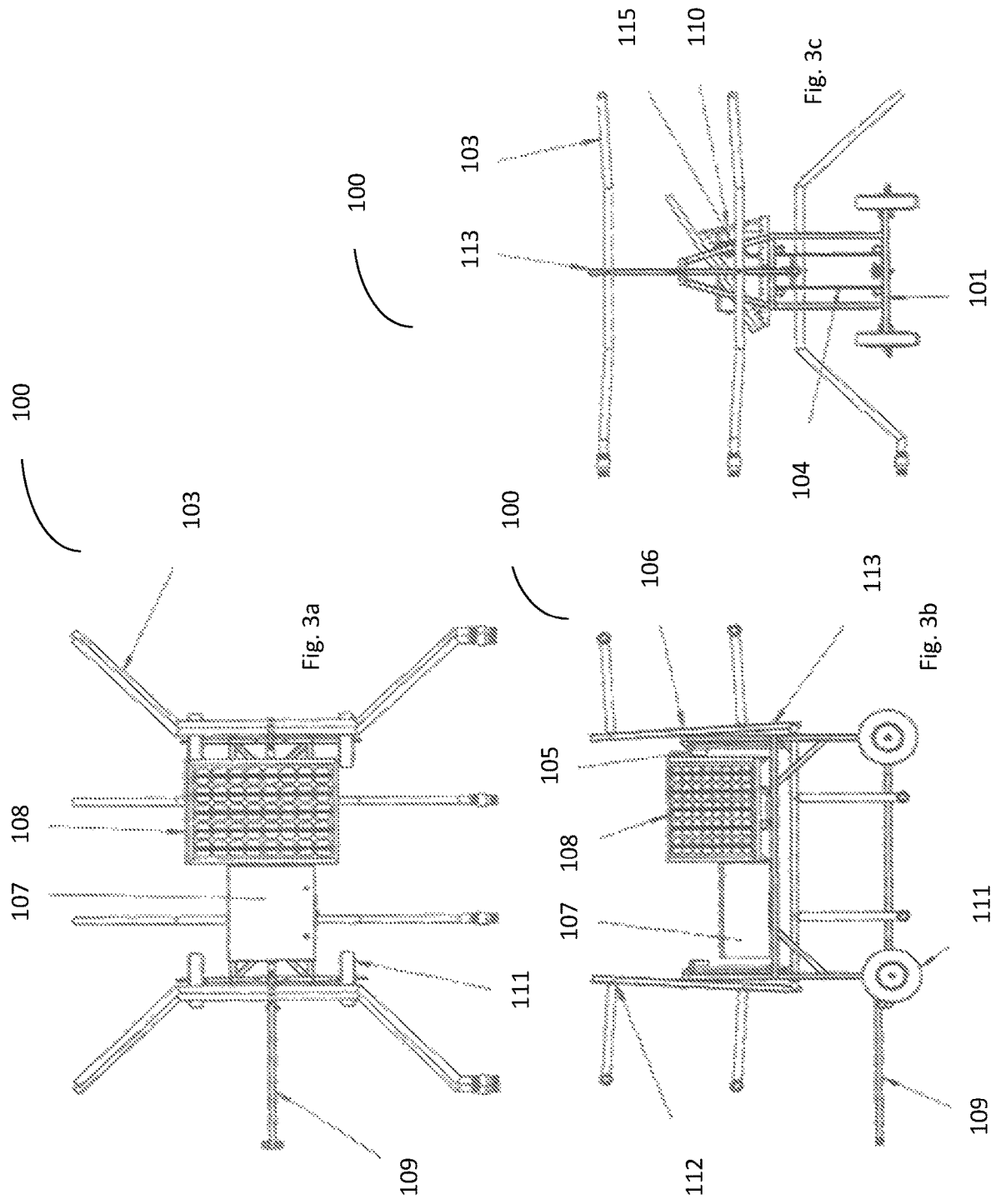

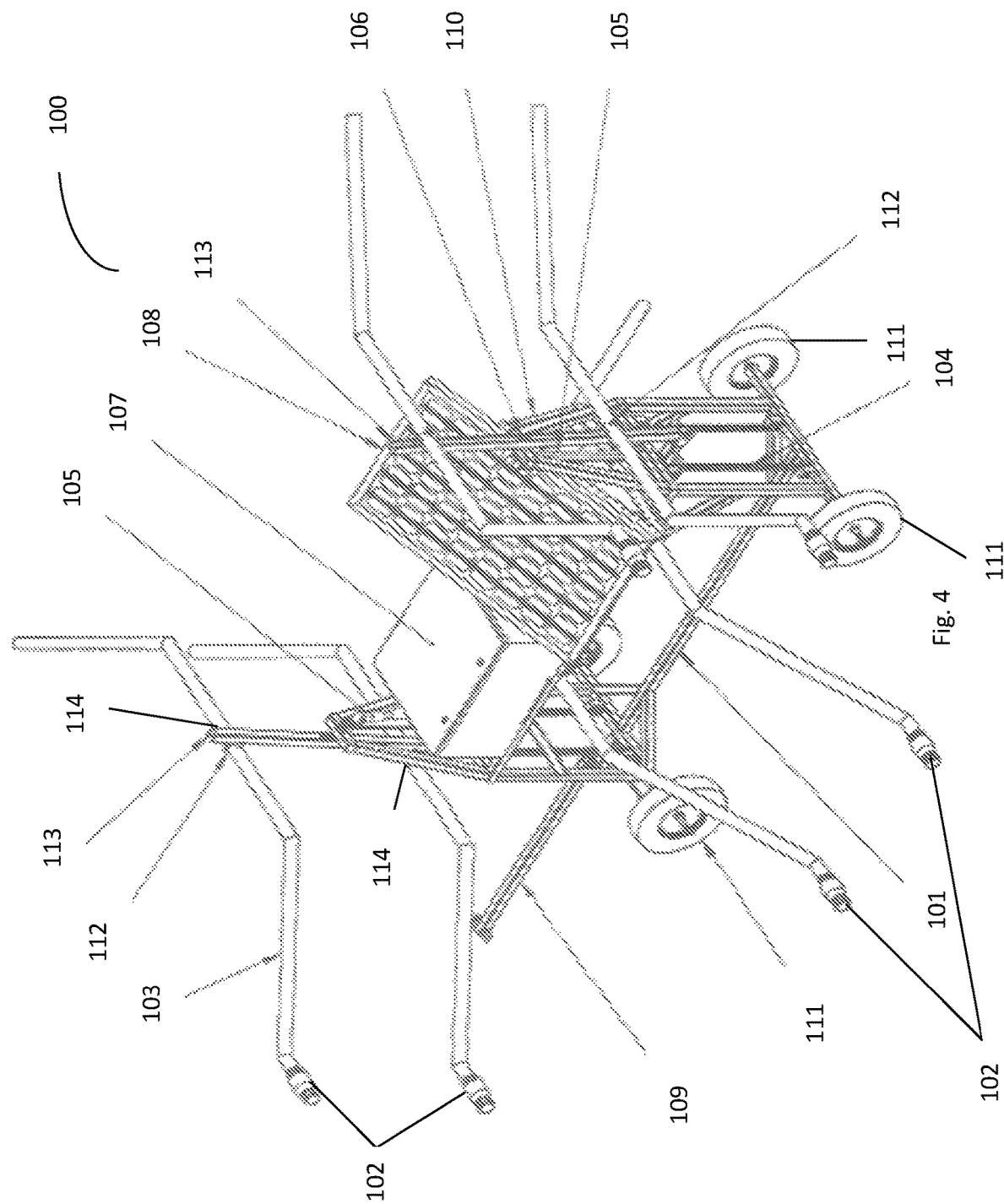

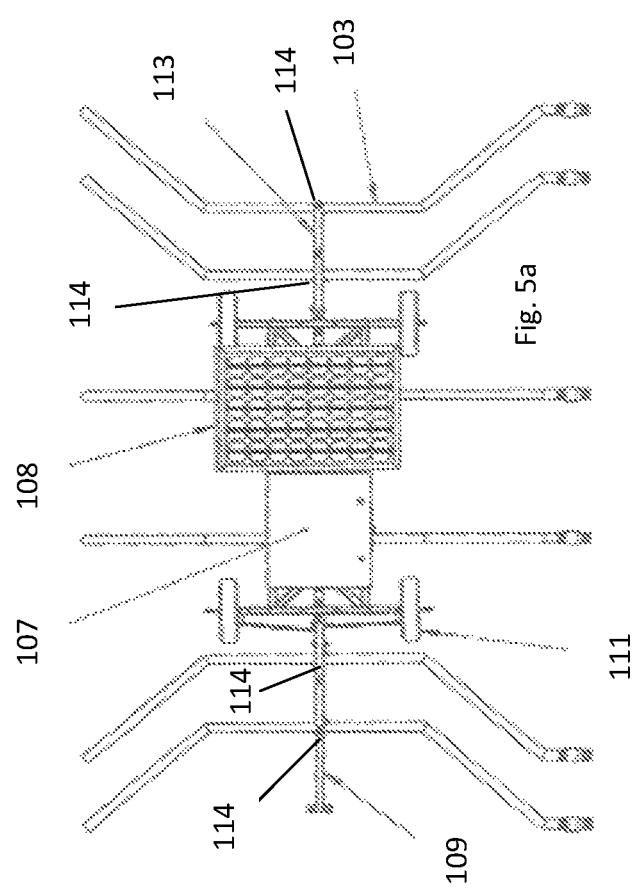
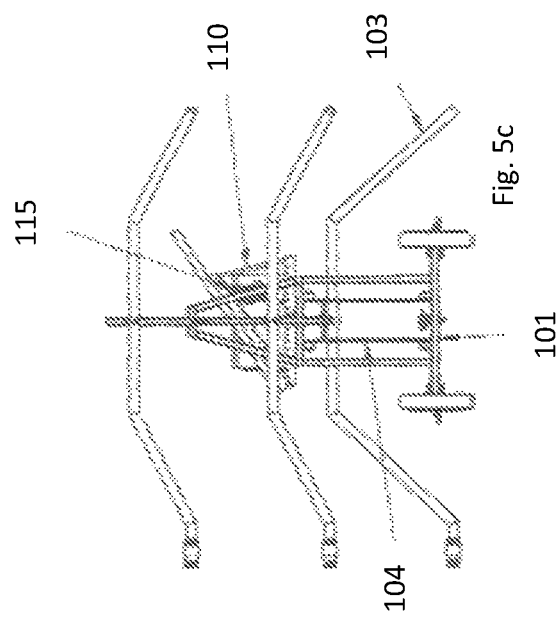
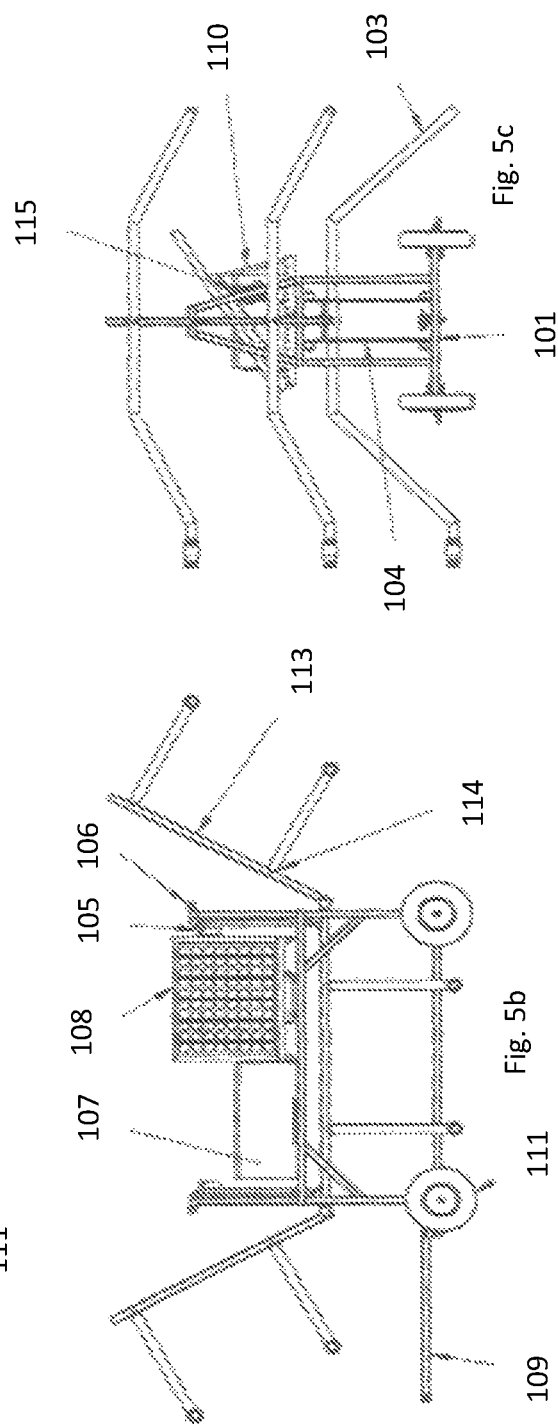

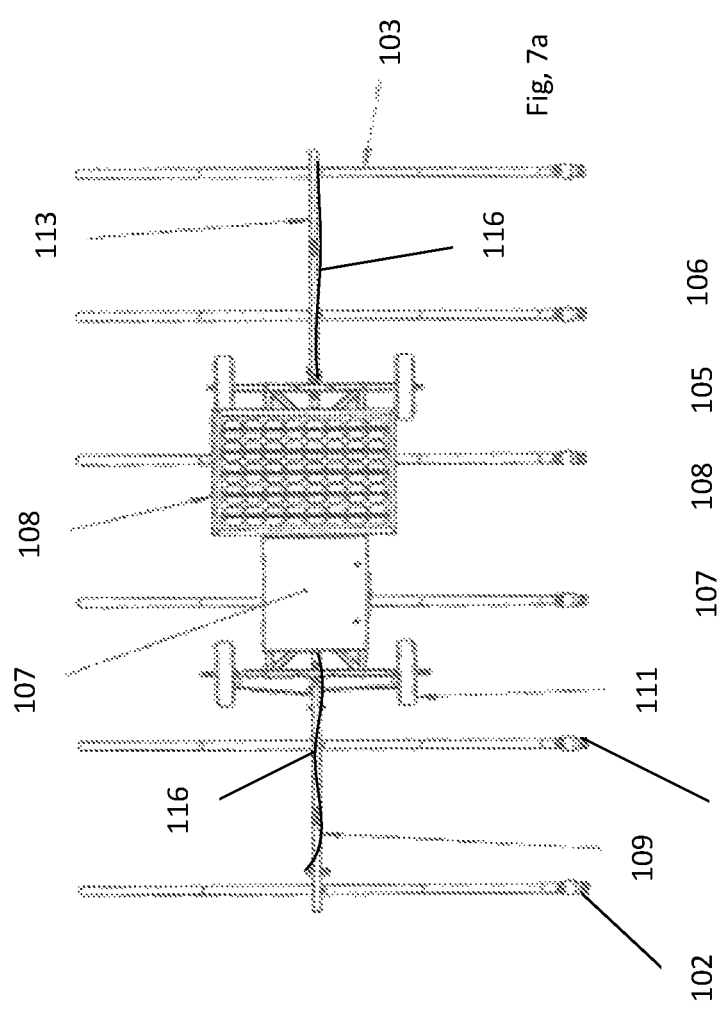
Fig. 7a
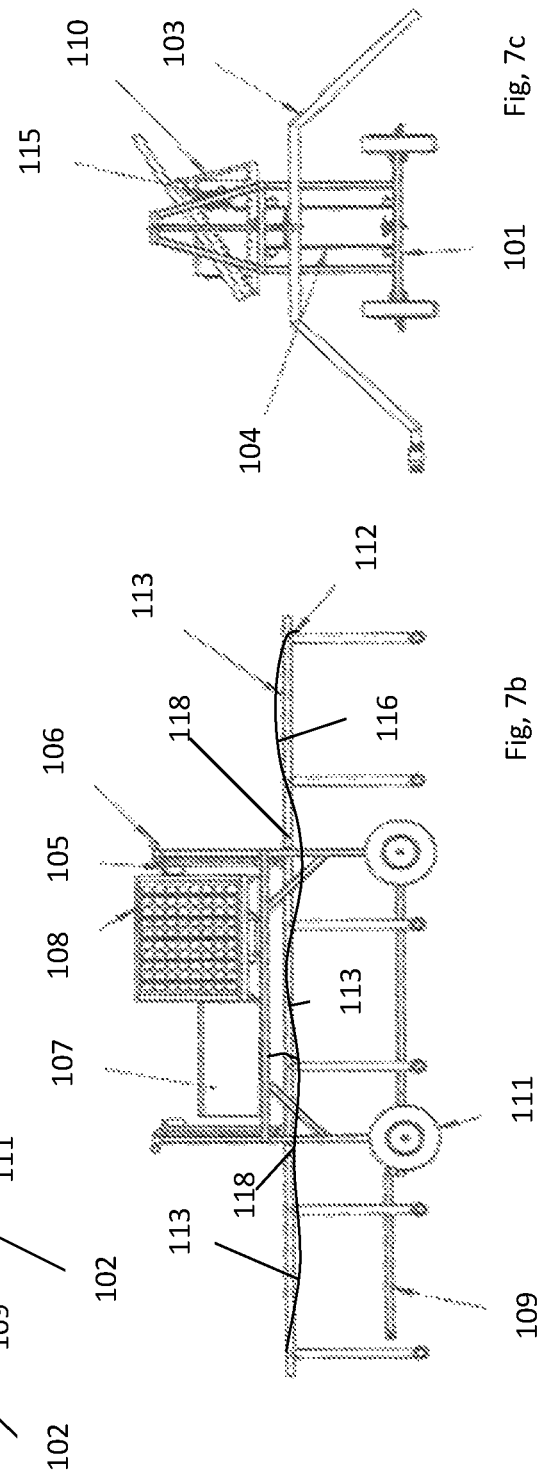
Fig. 7b
Fig. 7c

SIPHON PIPE-ROW CROP IRRIGATION SYSTEM AND METHOD

CROSS-REFERENCE TO RELATED APPLICATION(S)

This application is a continuation-in-part of prior-filed and co-pending U.S. patent application Ser. No. 17/482,421, entitled Siphon Pipe-row Crop Irrigation Machine, filed Sep. 23, 2021, by Delmar Gerald Woodward IV, the compete contents of which is hereby incorporated herein by reference.

BACKGROUND

Technical Field

The present device relates to the field of crop irrigation and more specifically to the siphon-based crop irrigation.

Background

This Siphon Pipe-Row Crop Irrigation Machine, further referred to as ("machine,") is being developed to substantially reduce the massive daily time requirement many farmers spend irrigating their row crops with siphon pipes during the crops' growing seasons. Historically, this has been a notoriously laborious task.

Siphon pipes are used by farmers to create a vacuum apparatus from a higher-level water ditch to a lower-level row crop. The suction in each siphon pipe is begun by hand, while the farmer is generally stooping over as s/he starts each pipe. Clearly, this work can cause incredible physical fatigue, especially when a farmer moves hundreds of pipes each day.

During a typical growing season, for a farm encompassing 350-acres of row crops, four farm laborers will spend approximately three hours per day (one and a half hours in the morning and one and a half hours in the evening) seven days a week for roughly three months a year starting and stopping their siphon pipe irrigation systems. At this rate, the farm laborers will spend 1,008 hours per year while the farmer incurs $25,200 in labor costs annually (based on a $25 hourly wage).

What is needed is a system, apparatus and/or method designed to fractionalize that time requirement.by 50-75 percent, as presented below.

SUMMARY

The Siphon Pipe-Row Crop Irrigation Machine reduces water, labor, and equipment costs associated with traditional siphon irrigation. The mobile machine will consist of a chassis supporting a retractable line of modified siphon pipes. The definition of modified siphon pipes is provided in the paragraph below. A variation of this machine may be produced that excludes the aforementioned chassis portion or includes the chassis portion with all pertinent vacuum and other electrical devices housed in one chassis, which may significantly lower the commercialized cost to build.

Definition: a modified siphon pipe is a curved plastic, rubber, or metal tube, retrofitted for attaching a nipple and vacuum hose with connection to a water pump or vacuum. The pipe will also be equipped with a flap valve (on the furrow-facing end) to ensure that the pipe can be made airtight. The pipe may also be equipped with a filter screen. Once retrofitted, each pipe will be assembled, and fastened to the line of other pipes.

Definition: the line of modified siphon pipes is the collection of appropriately spaced siphon pipes hoisted along the support arm. The electrical actuators and hydraulic cylinders or other lift system will lower the pipes on the ditch bank. A battery system will power electrical relays, turning the solenoids and vacuum pump on at the correct time to generate the initial suction needed to begin the water transfer.

After the irrigation is complete, the machine will then lift the line of pipes from the bank, and back to the top of the chassis. At this point, the machine will proceed to its next, predetermined irrigation location. This autonomous motion will be induced either by GPS, timers, or water flow meters, tensiometers, reflectometers or other telemetry induced-soil moisture sensors located at the opposite end of the field. These metrics will be viewable in a cellular-based application.

Once the line of pipes is partially lowered, they may be adjusted by using several different mechanical methods. They may be moved electrically, hydraulically, pneumatically, or manually with a clamp, crank, or spring-action mechanism. This will be done to ensure the pipes are properly spaced between the dirt ridges. Once the siphons have descended on to the ditch bank, the electric pumps will initiate a vacuum of at least 9.5 PSI, closing the flap valve, transferring the water from the ditch, over the bank, and into the furrows. Per 1½"×7' pipe, the water transfer will initiate within 4.5 to 8.5 seconds of the vacuum initiation. The machine may utilize differing pipe bends, lengths, and diameters. Once the vacuum has begun, the software will begin the water transfer process per pipe or per pipe section, up or downstream, depending on the field placement of the machinery.

The reason for the siphon pipes' retractable characteristic is to prevent the machine from dragging the pipes through the dirt, rock, or any other potentially damaging material.

The line of modified siphon pipes will be fastened to the electrical actuators. The actuators are fastened to the metal frame, (also known as the "chassis"). The steering mechanism may be composed of wheel axles or spindles which may be collapsible. The chassis may also be equipped with two handles on each end, so that multiple chassis can be stacked, and loaded into a truck bed.

Each chassis will be approximately 5' long×3' wide×4' tall (when the collapsible wheels are extended). The total machine length will vary based on the number of chassis and siphon pipes required to efficiently irrigate the field. A larger or smaller chassis may be produced to reduce manufacturing costs.

This irrigation machine may be propelled by electric motors. The electric motor will be bolted to the chassis and equipped with a PTO (power take off) to which a sprocket can be welded. This frame-top sprocket will be affixed to a chain, and that chain will extend to the front of rear axle's sprocket. The front and rear axles will be conjoined by a separate sprocket and chain system.

If said axles are negatively affected by the mounded ditch banks, it will become necessary to introduce a direct-drive system involving four motors with four PTOs, four chains and eight sprockets to power this machine.

It is crucial that this machine's design places these motors in a location where they will be unaffected by ditch water. Potentially, these motors and powering batteries should be elevated several feet above the bank, atop a flat surface on the chassis' frame, so that they are not susceptible to water damage. The machine's batter pack and charging system will supply power to the machine's electrical, mechanical, and other mechatronic systems.

If water-proofed electric motors can be cost effectively obtained and fastened directly to each wheel, then that system may be used instead. It is the applicant's hope that the farmers implementing this system will float the top of the ditch bank to provide ample width and a flat surface for the irrigation machine to move along the bank.

The machine's chassis, and some of its other metallic components, will be composed of either galvanized or stainless steel, or high-strength aluminum to maximize the useful life of this machine. The pipes will be composed of either a metallic, rubber, plastic, or other synthetic material.

The machine will be welded and riveted, grided, sanded, and painted so that is it free of any sharp objects.

In some embodiments, a system of one or more components and computers can be configured to perform particular operations or actions by virtue of having software, firmware, hardware, or a combination of them installed on the system that in operation causes or cause the system to perform the actions. One or more components and/or computer programs can be configured to perform particular operations or actions by virtue of including instructions that, when executed by data processing apparatus, cause the apparatus to perform the actions. One general aspect comprises a chassis comprised of a support member coupled with said chassis; a plurality of siphon pipes, where each said siphon pipe may include: a flap valve at a first end, and an air hose nipple attachment (for a quick release air house connection, in some embodiments), a vacuum pump mechanically coupled with each said air hose nipple, an actuator coupled with said support member, and a power source coupled with said vacuum pump and said actuator, where each of said plurality of siphon pipes are releasably coupled with said support member and said vacuum pump, and where said actuator is adapted and configured to raise and lower said plurality of siphon pipes relative to said chassis. Other embodiments of this aspect can comprise corresponding components, computer systems, apparatus, and computer programs recorded on one or more computer storage devices, each configured to perform the actions of the methods.

Implementations can include one or more of the following features: The irrigation apparatus wherein said vacuum pump induces a vacuum within each of said plurality of siphon pipes sequentially, and/or wherein the aid vacuum pump is activated for a prescribed time period. Each said siphon pipe can be equipped with an air hose nipple located on the apex or apex region of each said siphon pipe. In some embodiments, at least one of said plurality of siphon pipes can have a substantially more parabolic shape than those depicted in most of the drawings. Moreover, in some embodiments, if at least one sensor determines that moisture content exceeds a prescribed threshold, said siphon pipes can be raised via said actuator. Implementations of the described techniques may include hardware, a method or process, or computer software on a computer-accessible medium.

BRIEF DESCRIPTION OF THE DRAWINGS

Further details of the present device are explained with the help of the attached drawings in which:

FIGS. 2a-2b depict and embodiment of the modified siphon pipe.

FIGS. 3a-3c depict an embodiment of the apparatus in a first configuration.

FIG. 4 depicts an alternate view of an embodiment of the apparatus is the first configuration.

FIGS. 5a-5c depict an embodiment of the apparatus in a second (partially deployed) configuration.

FIGS. 7a-7c depict an embodiment of the apparatus in a deployed configuration.

vacuum system.

Figure 1A:
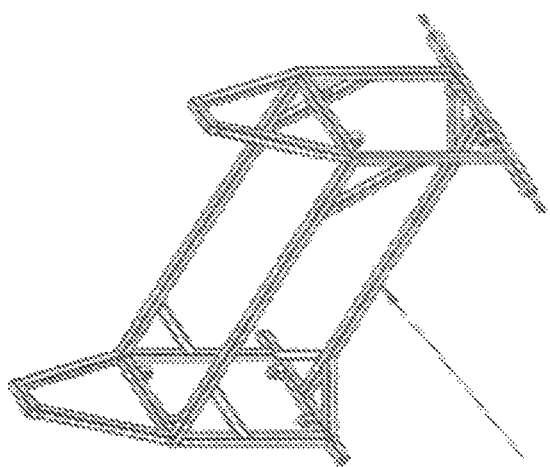
FIGS. 1a-1d depict an embodiment of the frame of the chassis.
Figure 1B:
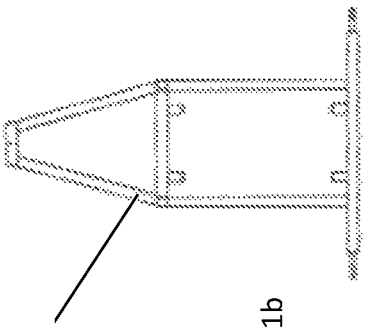
Figure 1C:
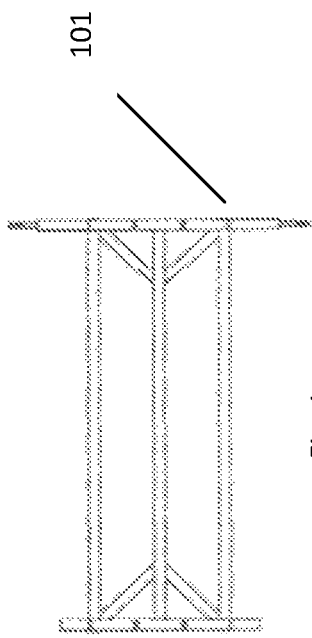
Figure 1D:
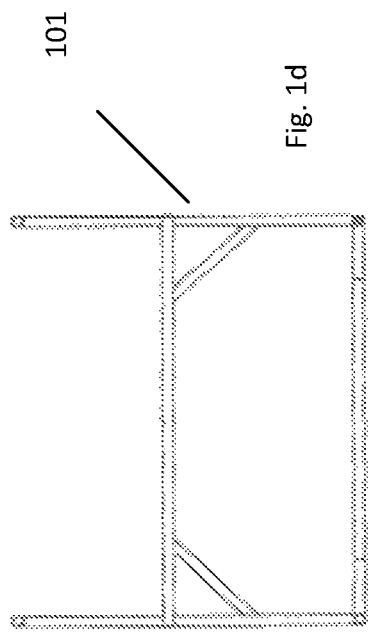
Figure 6:
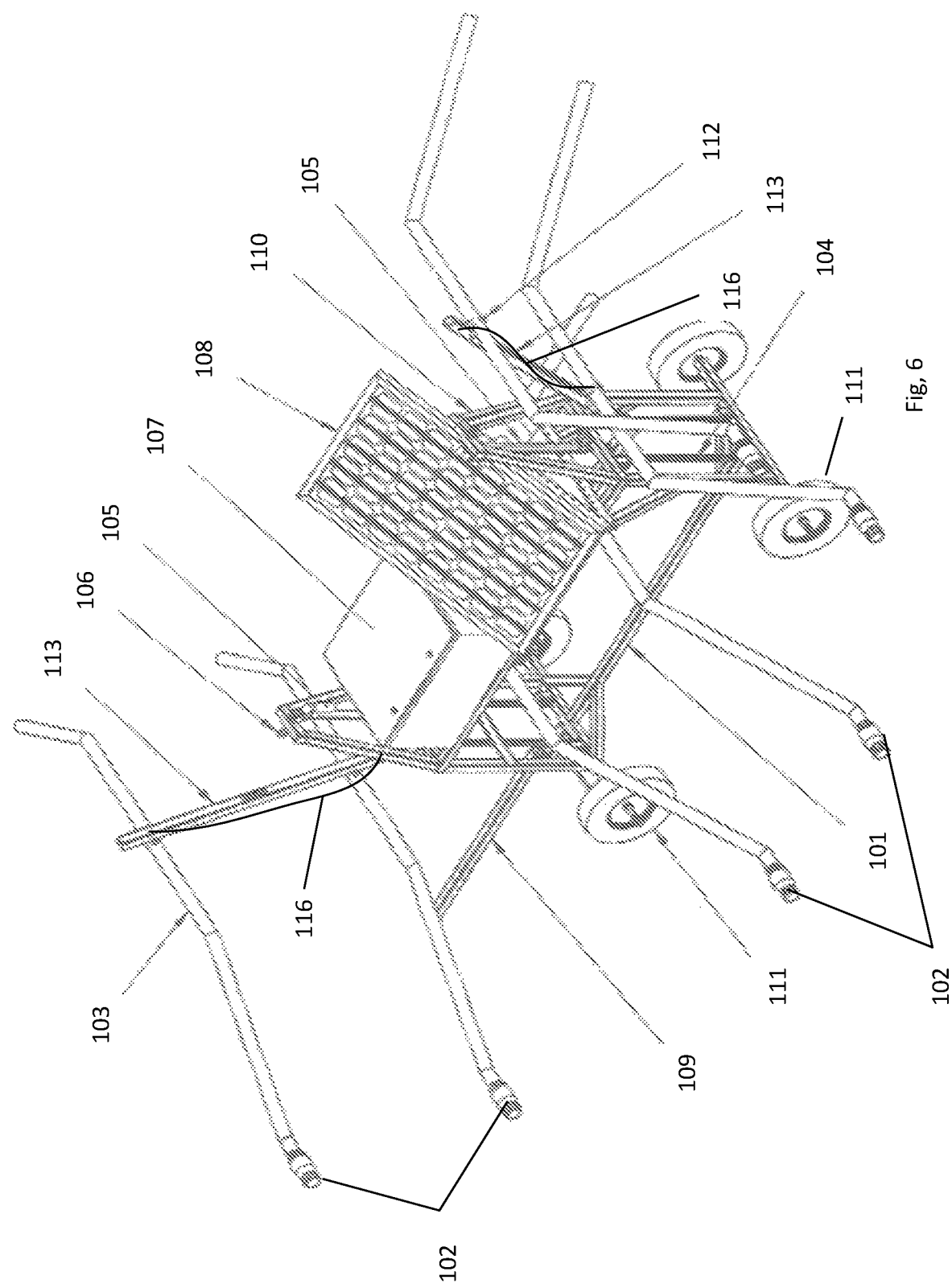
FIG. 6 depicts an alternate view of an embodiment of the apparatus in a second (partially deployed) configuration.
Figure 8:
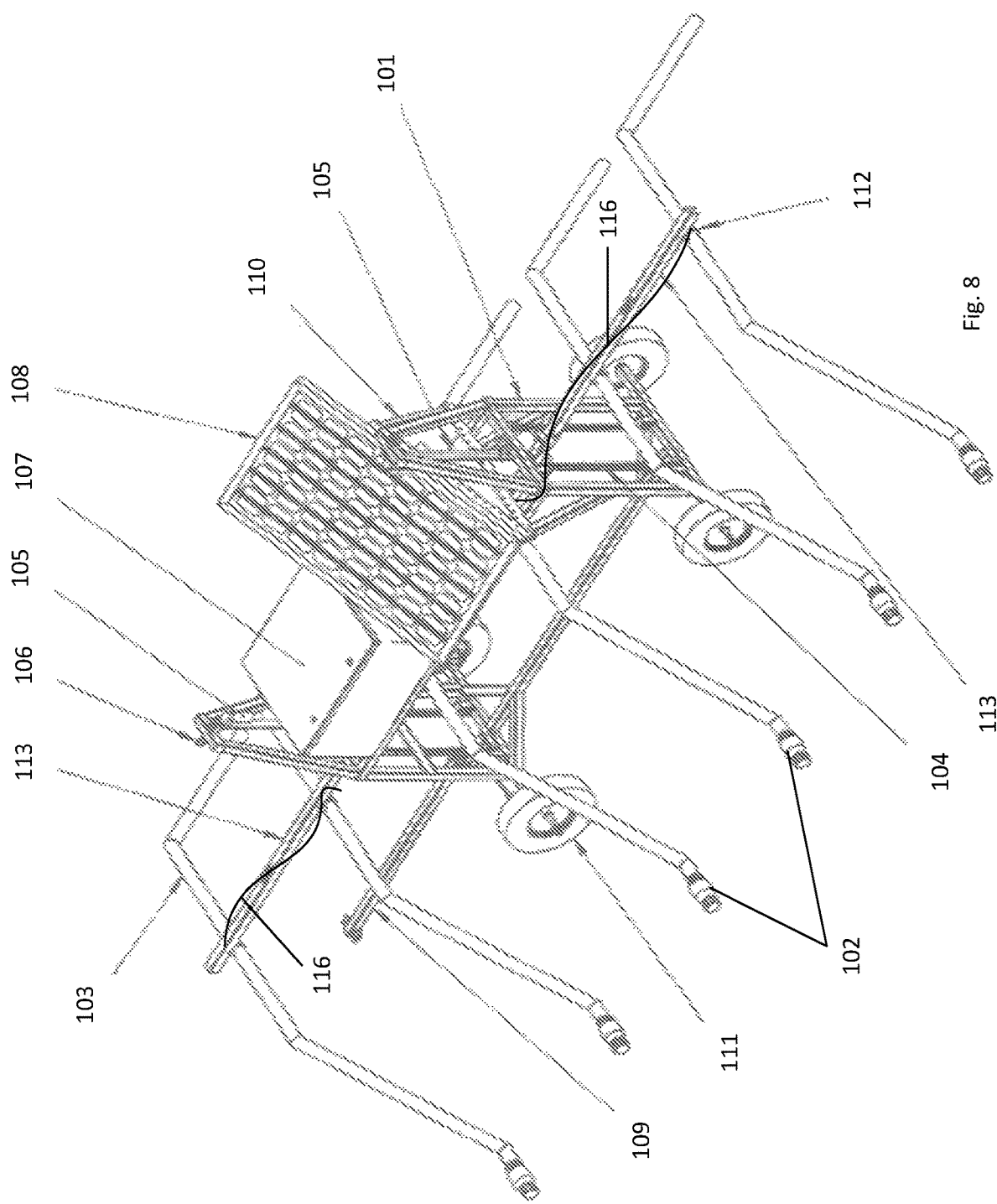
FIG. 8 depicts an alternate view of the apparatus in a deployed configuration.
Figure 9:
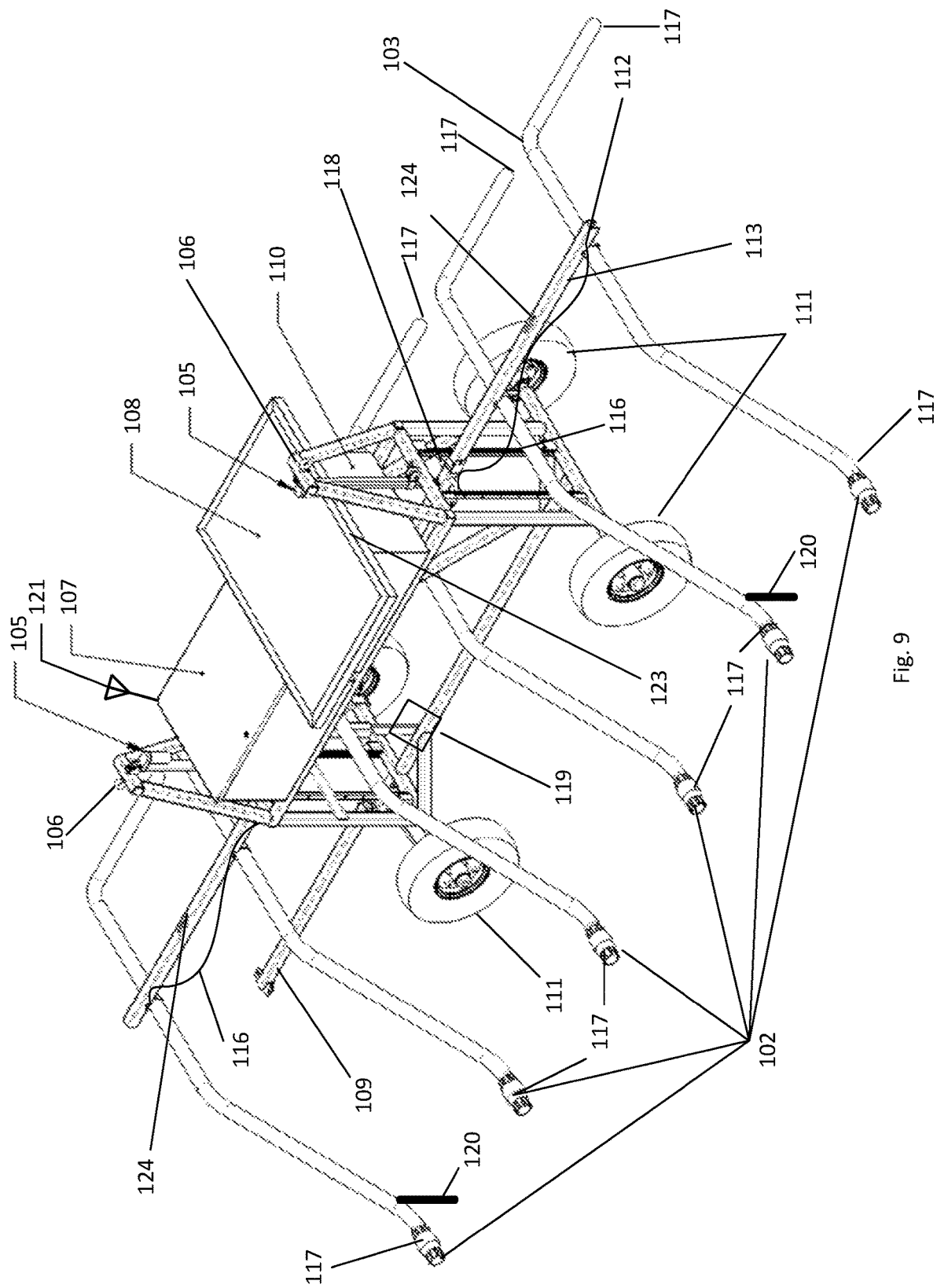

FIG. 9 depicts an alternate embodiment of the apparatus in a deployed configuration.

Figure 10:
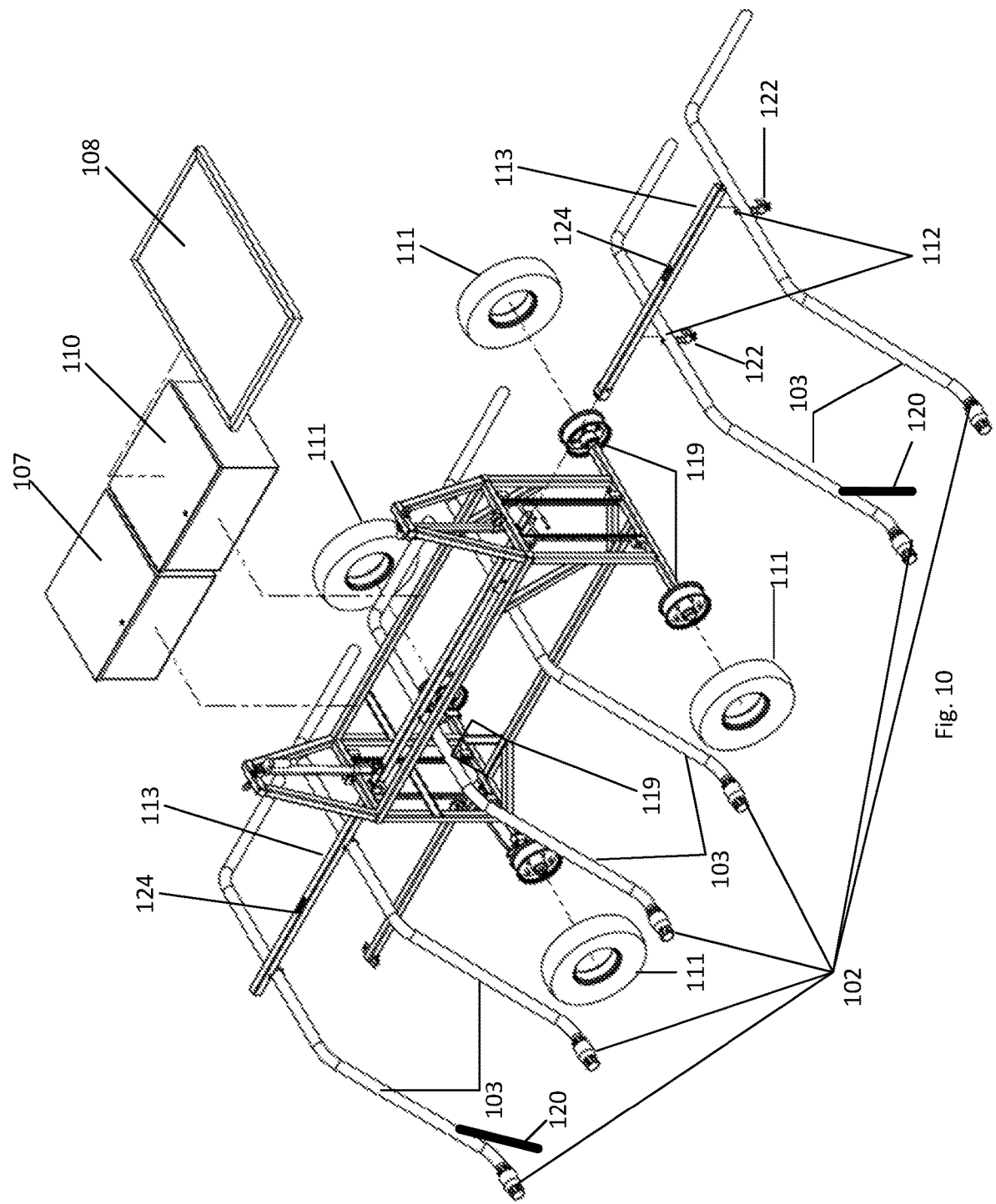

FIG. 10 depicts an exploded view of the apparatus depicted in FIG. 9.

Figure 11:
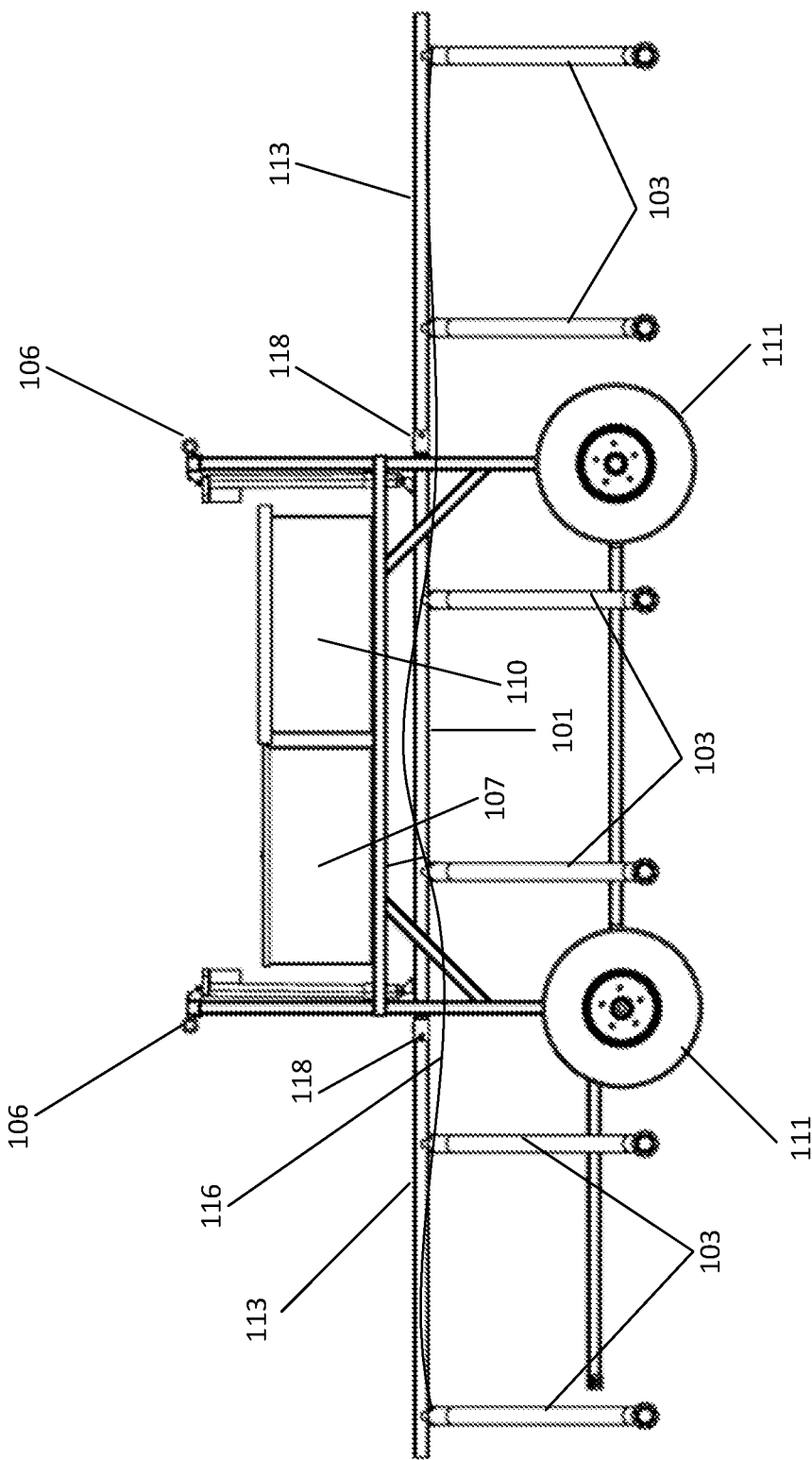

FIG. 11 depicts a side elevation view of the apparatus depicted in FIG. 9.

Figure 12:
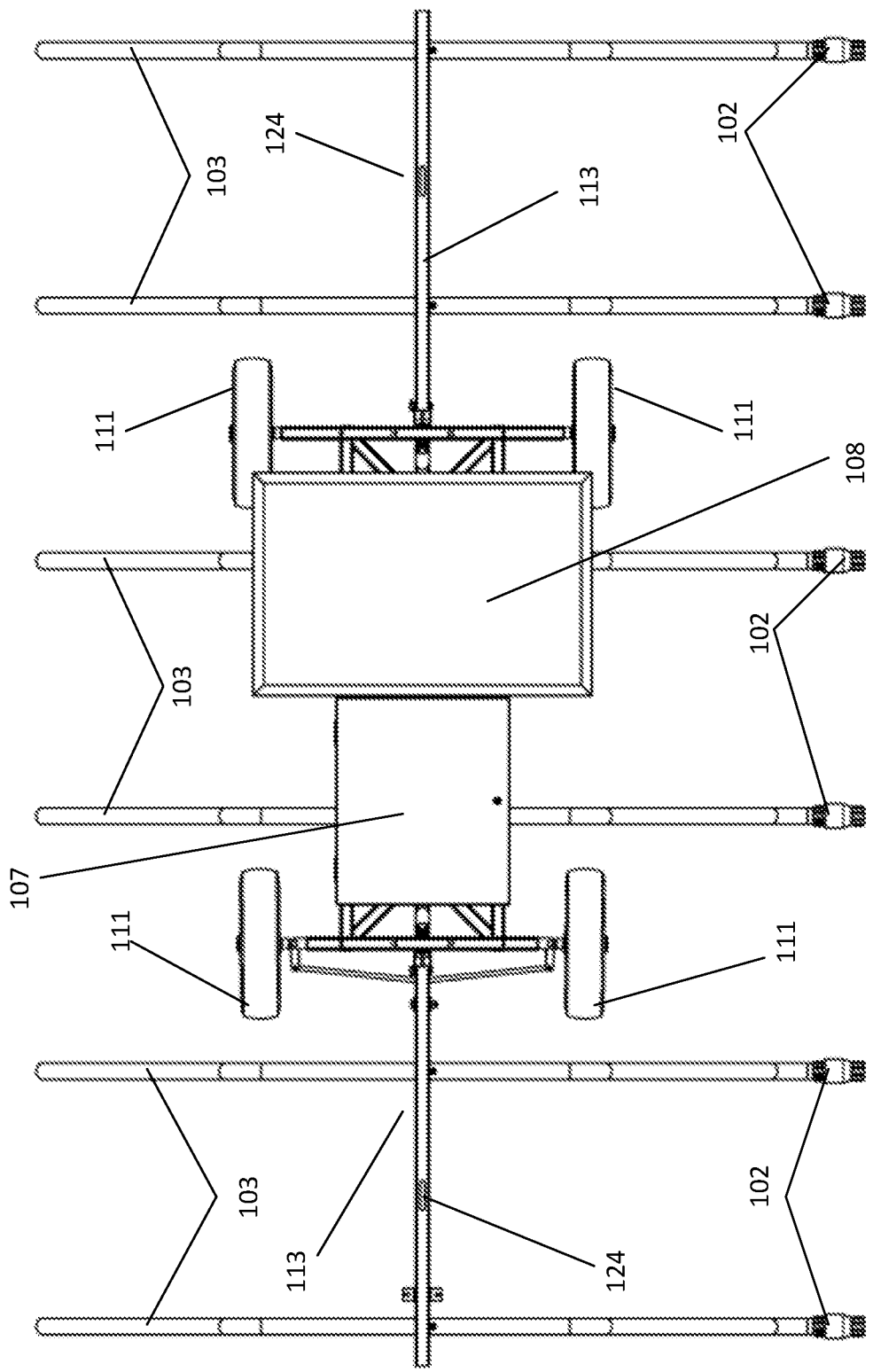

FIG. 12 depicts a top view of the apparatus depicted in FIG. 9.

Figure 13:
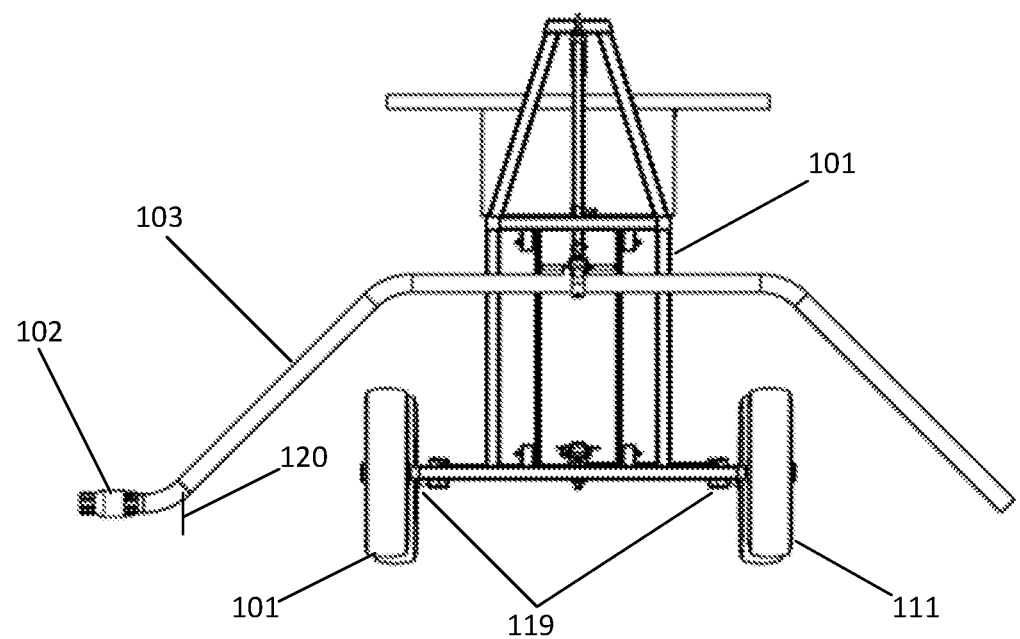

FIG. 13 depicts an end elevation view of the apparatus depicted in FIG. 9.

Figure 14:
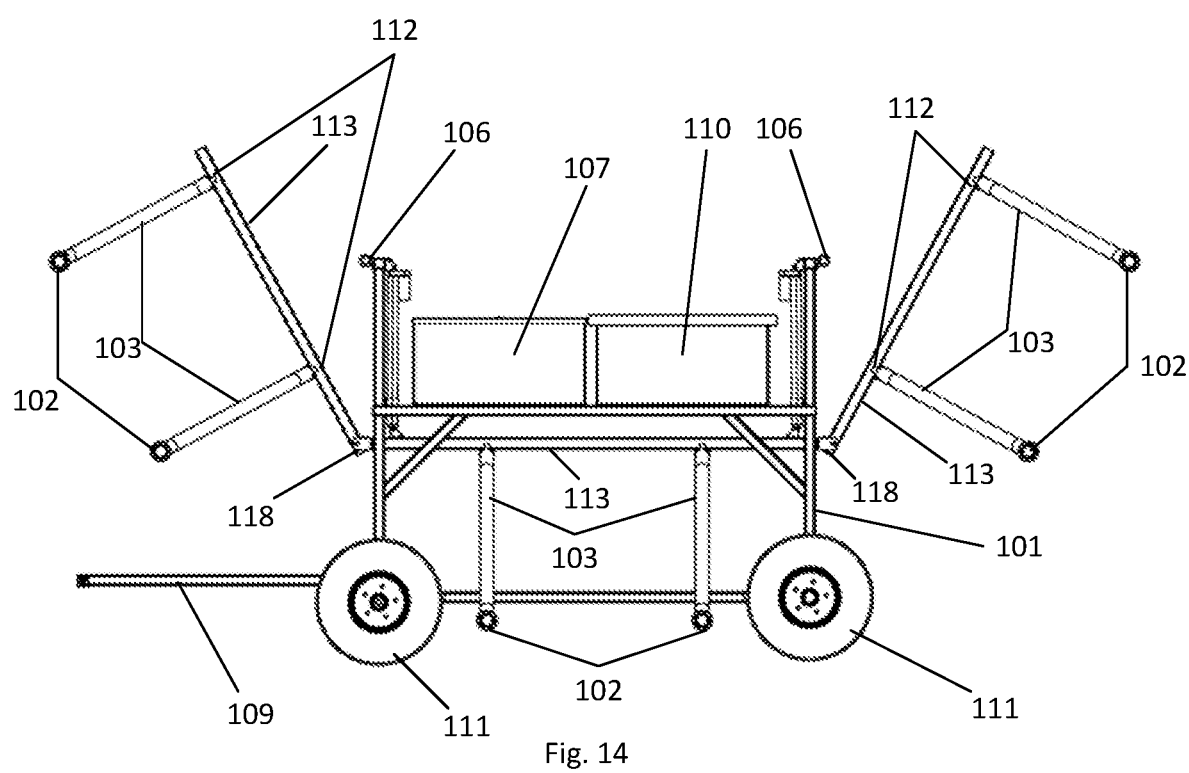

FIG. 14 depicts an alternate side elevation view of the apparatus depicted in FIG. 9 in a partially deployed/collapsed configuration.

Figure 15:
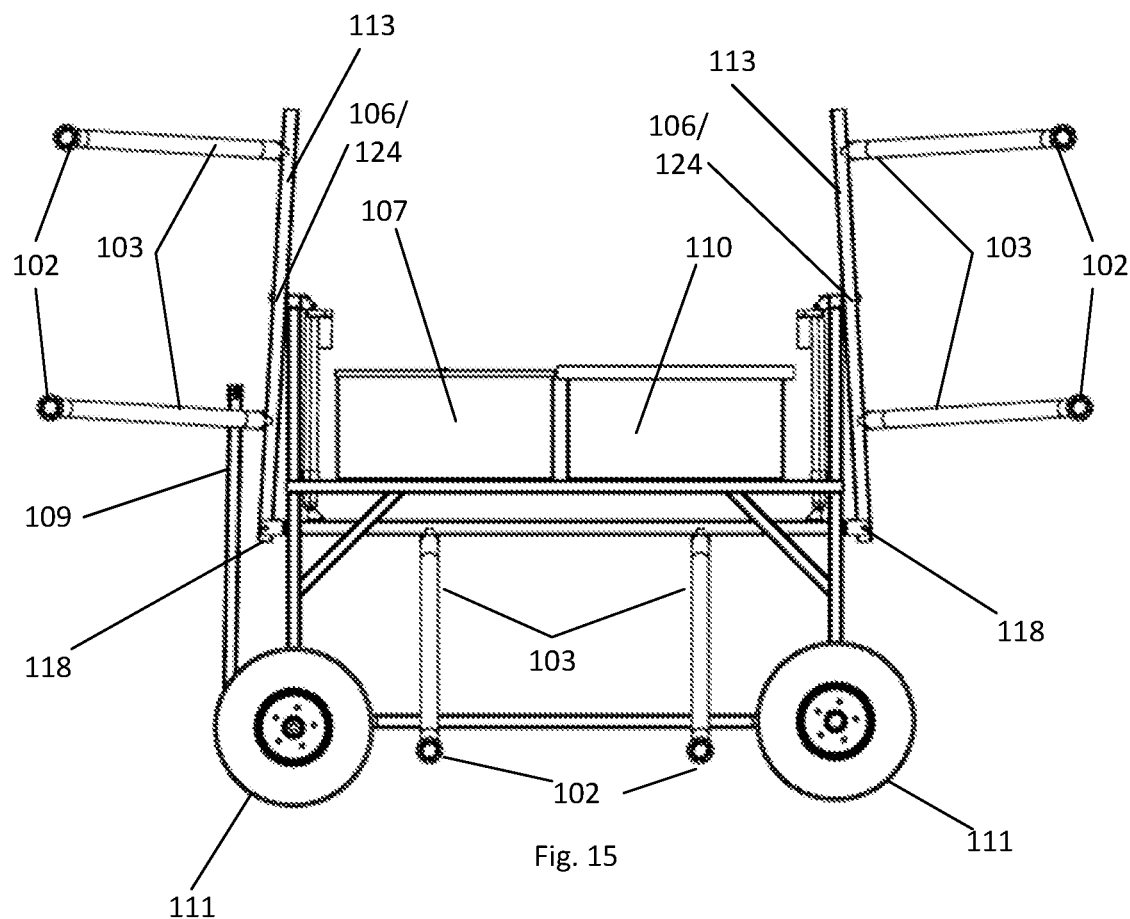

FIG. 15 depicts an alternate side elevation view of the apparatus depicted in FIG. 9 in a collapsed configuration.

Figure 16:
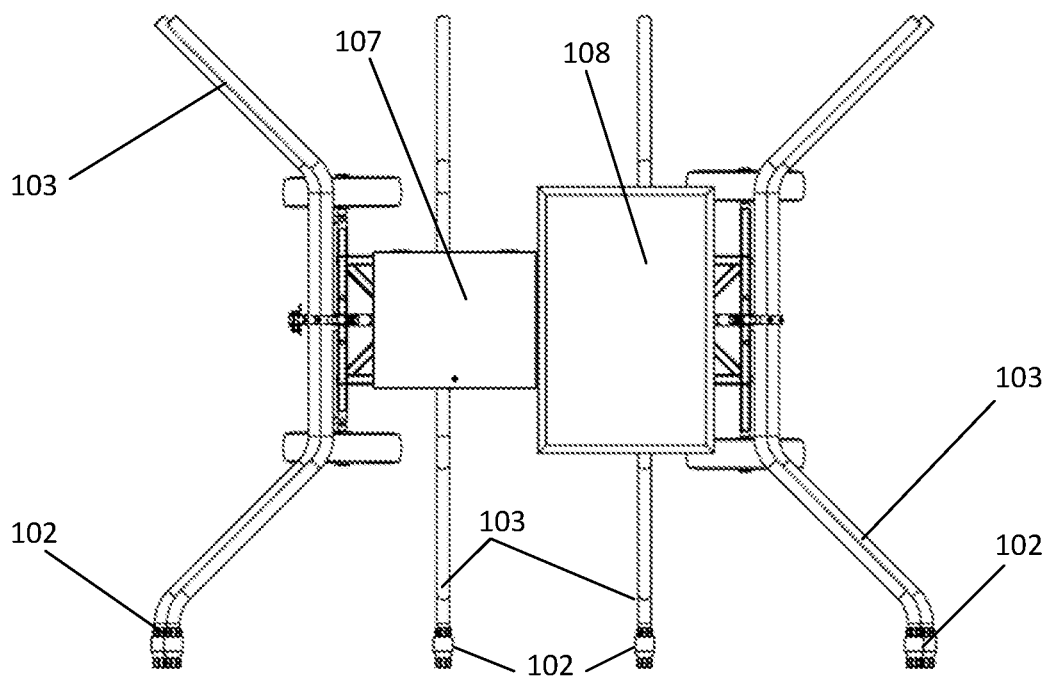

FIG. 16 depicts an alternate end elevation view of the apparatus depicted in FIG. 9 in a collapsed configuration.

Figures 17A, 17B, 17C, 18:
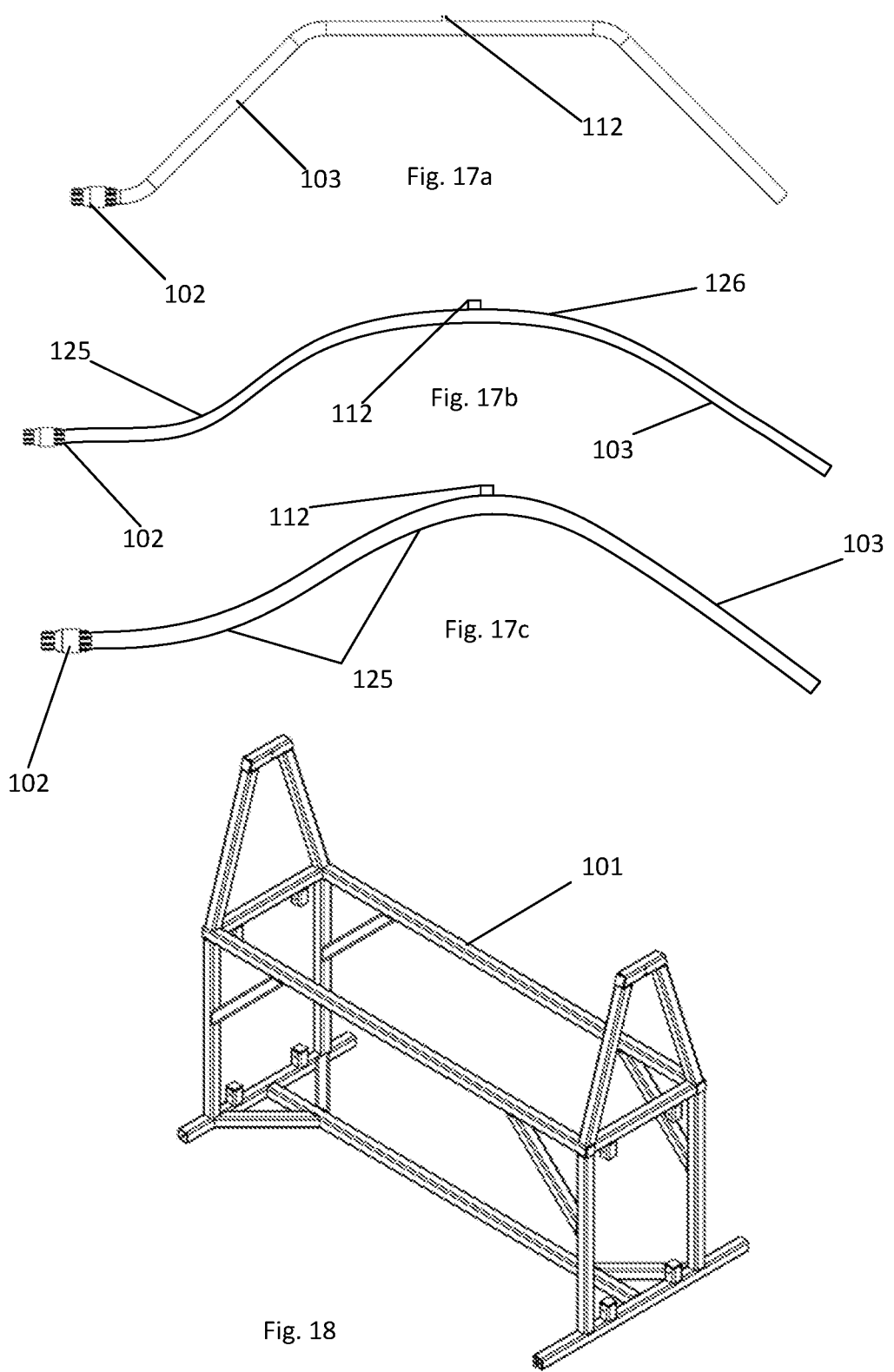

FIGS. 17a-17c depict alternate embodiments of the siphon pipe.

FIG. 18 depicts an alternate embodiment of the chassis.

Figure 19:
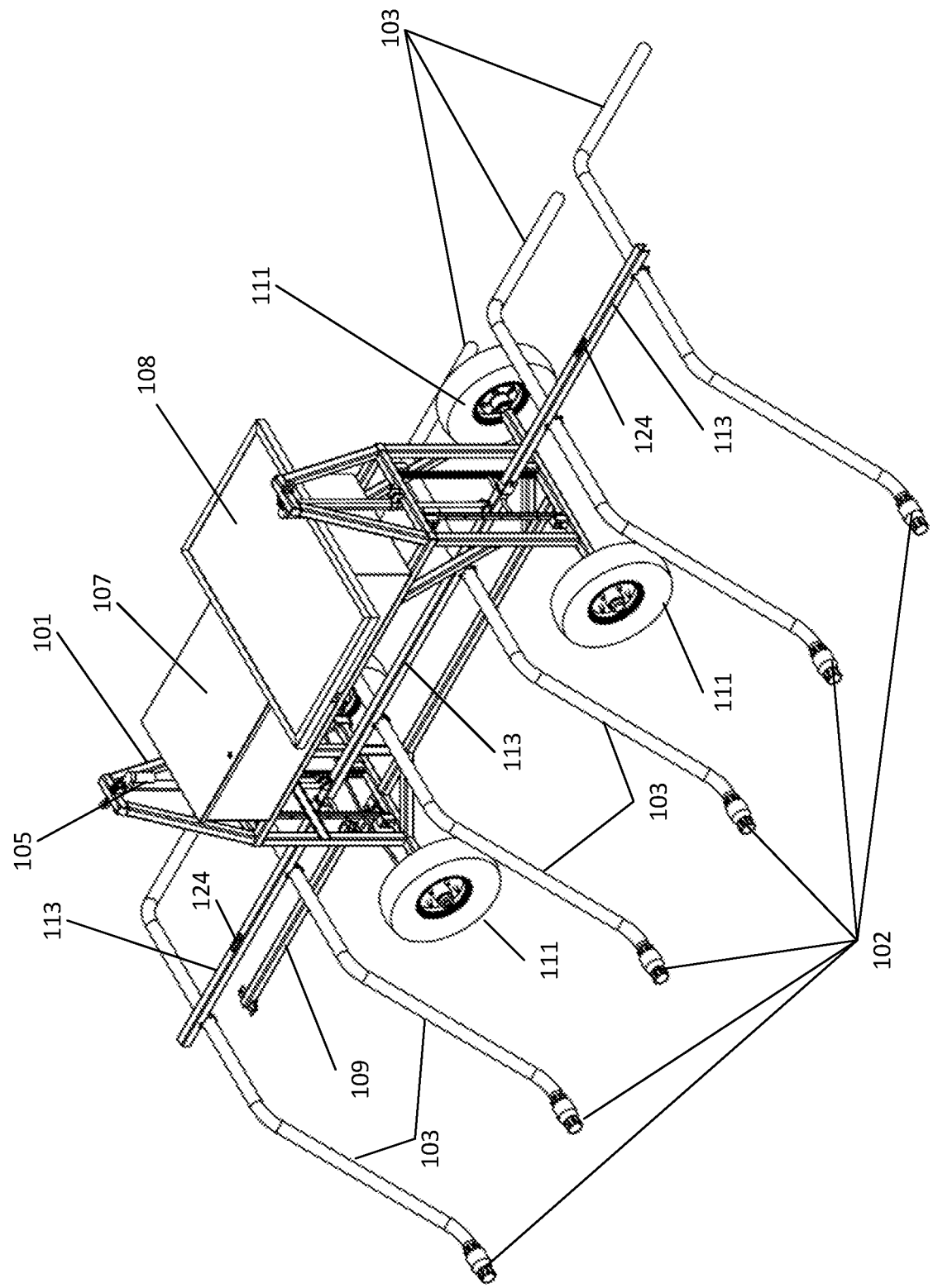

FIG. 19 depicts an alternate embodiment of the apparatus in a deployed and lowered configuration.

Figure 20:
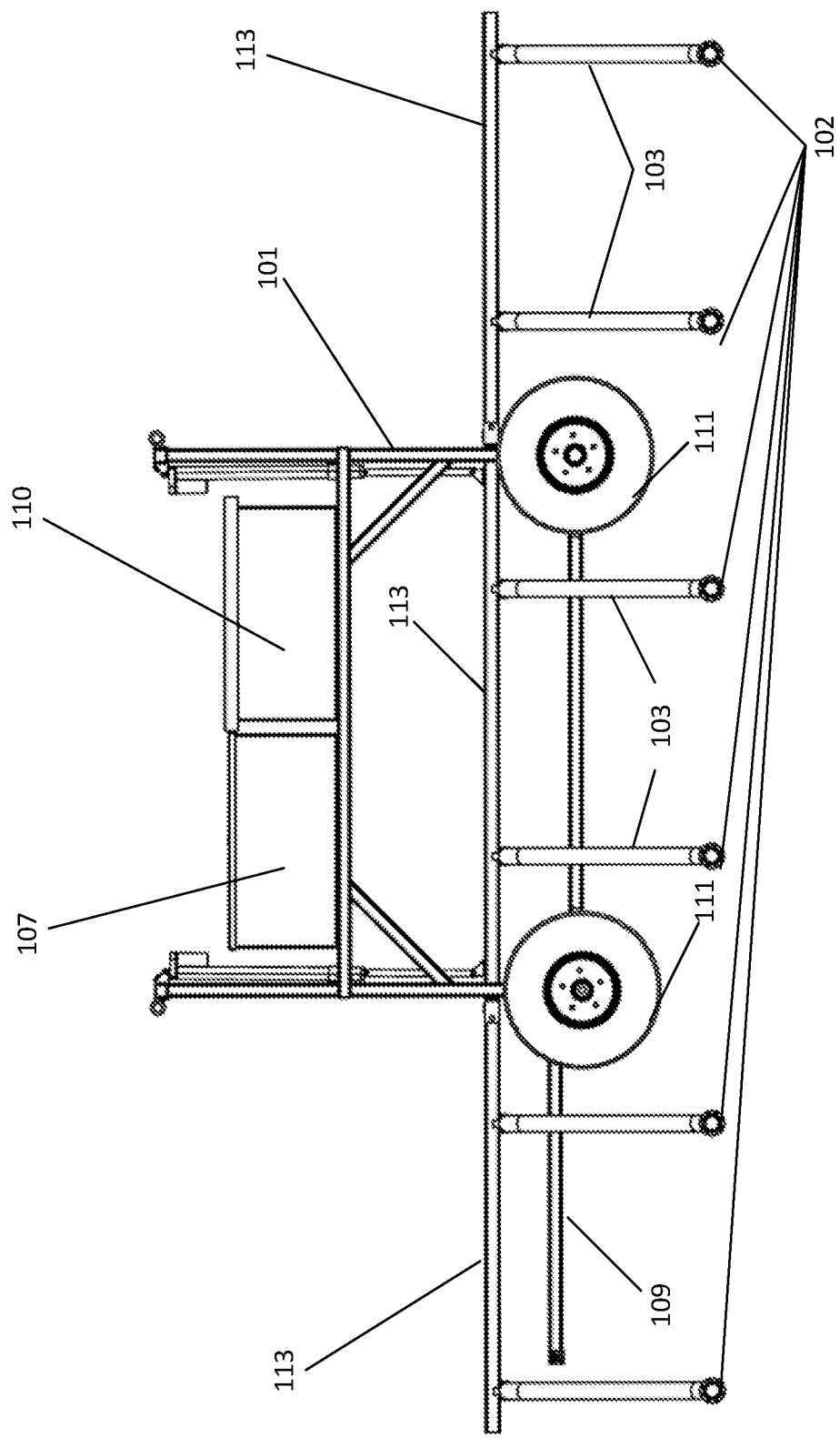

FIG. 20 depicts a side elevation view of the apparatus depicted in FIG. 19.

Figure 21:
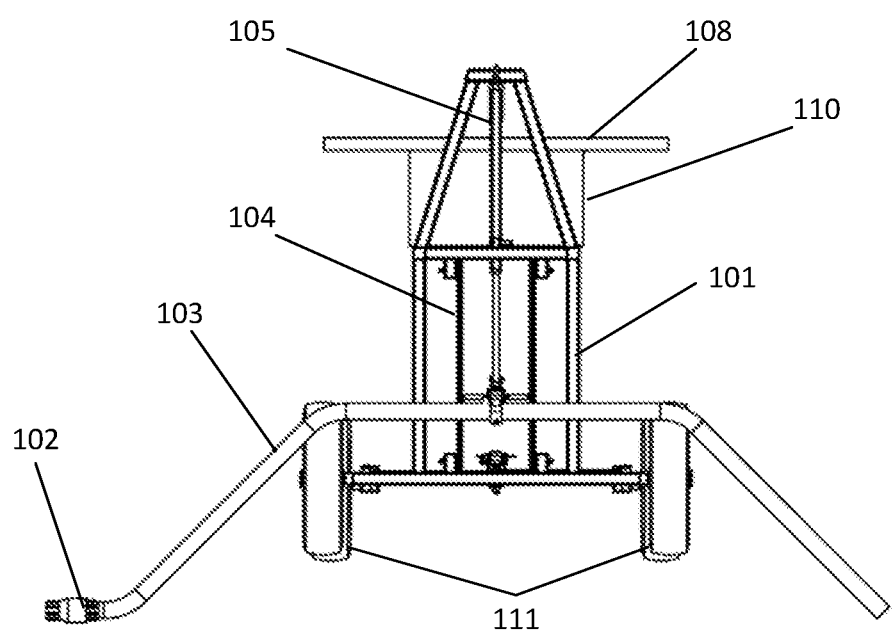

FIG. 21 depicts an end elevation view of the apparatus depicted in FIG. 19.

Figure 22:
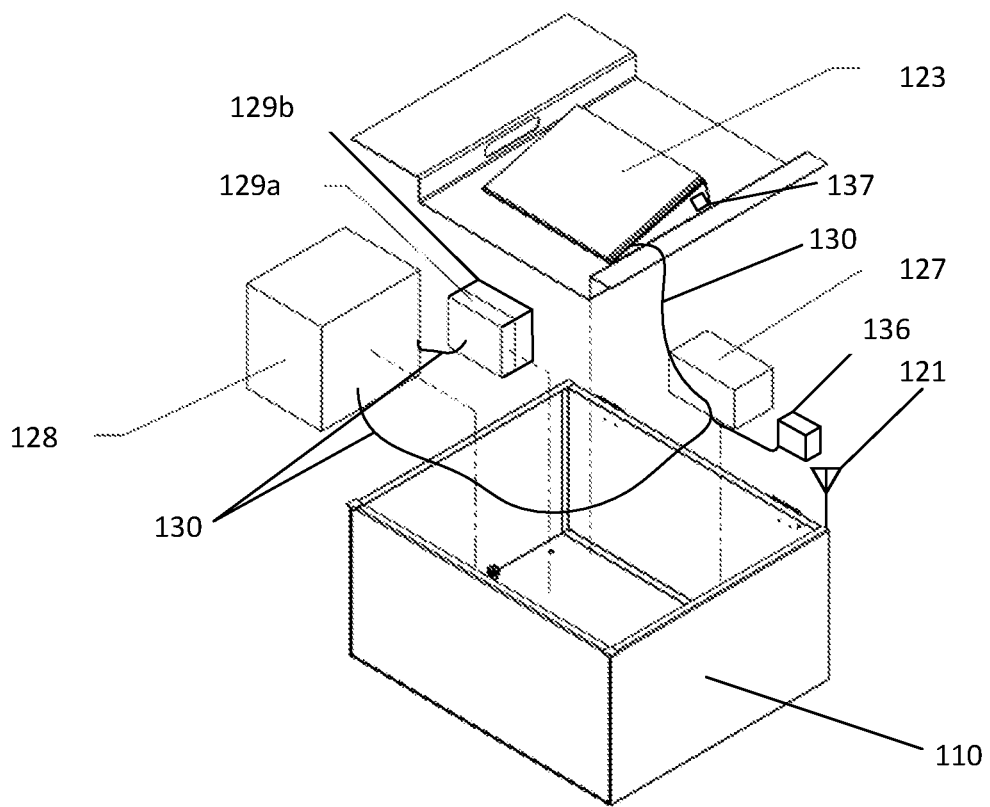

FIG. 22 depicts an exploded view of the electrical component box of the apparatus.

Figure 23:
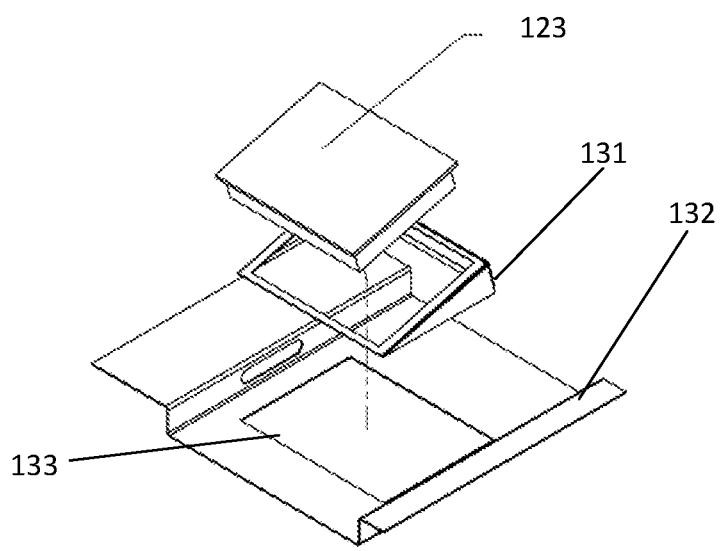

FIG. 23 depicts an exploded view of interface components.

Figure 24:
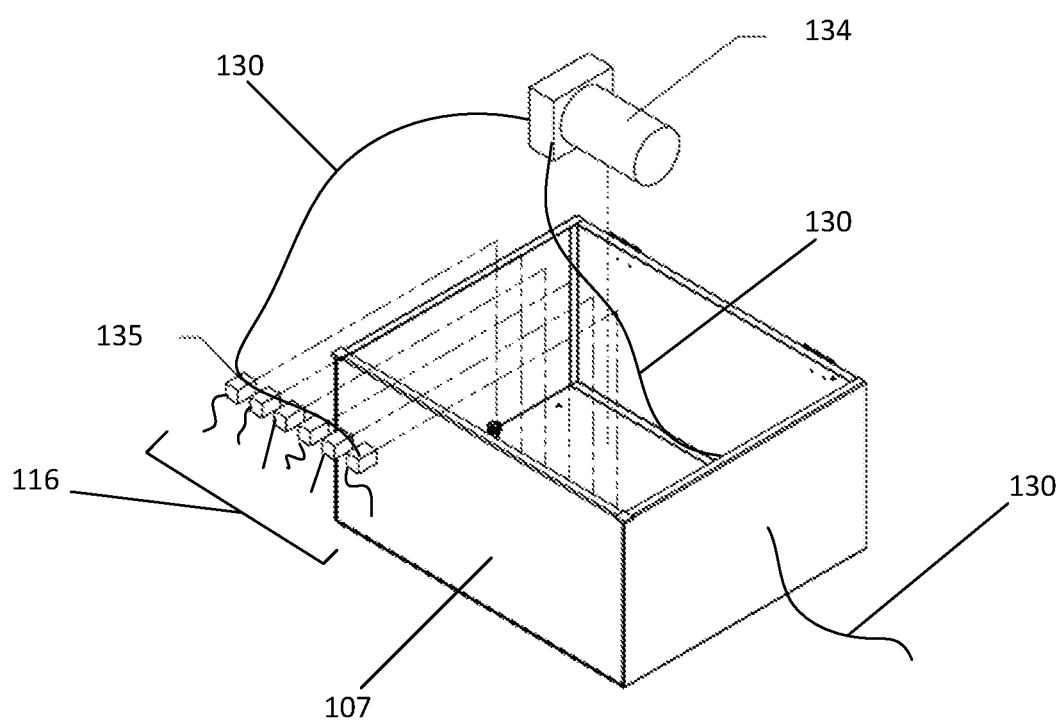

FIG. 24 depicts an exploded view of the pump box of the apparatus.

Figure 25:
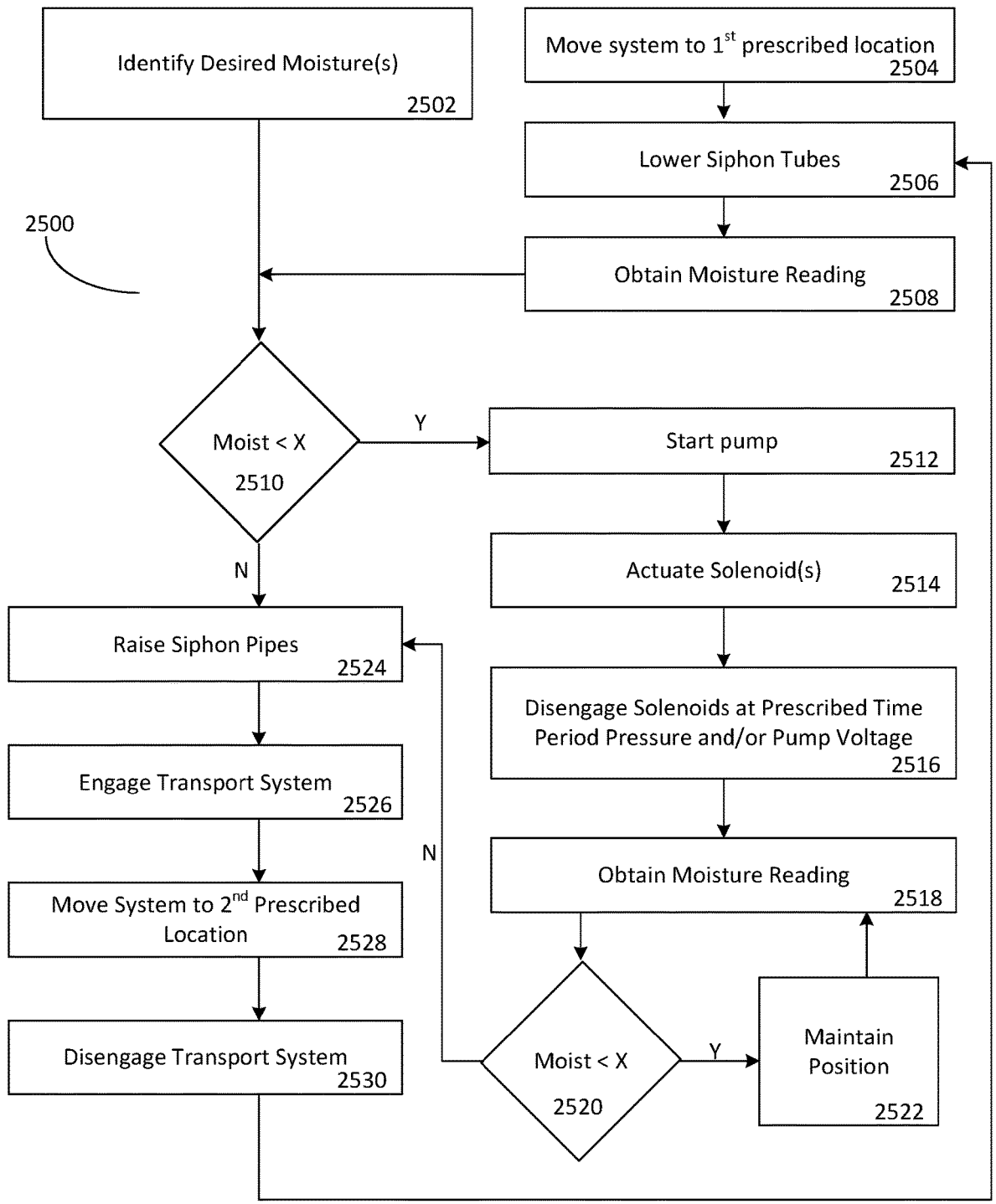

FIG. 25 depicts a method of operation of the apparatus.

Figure 26:
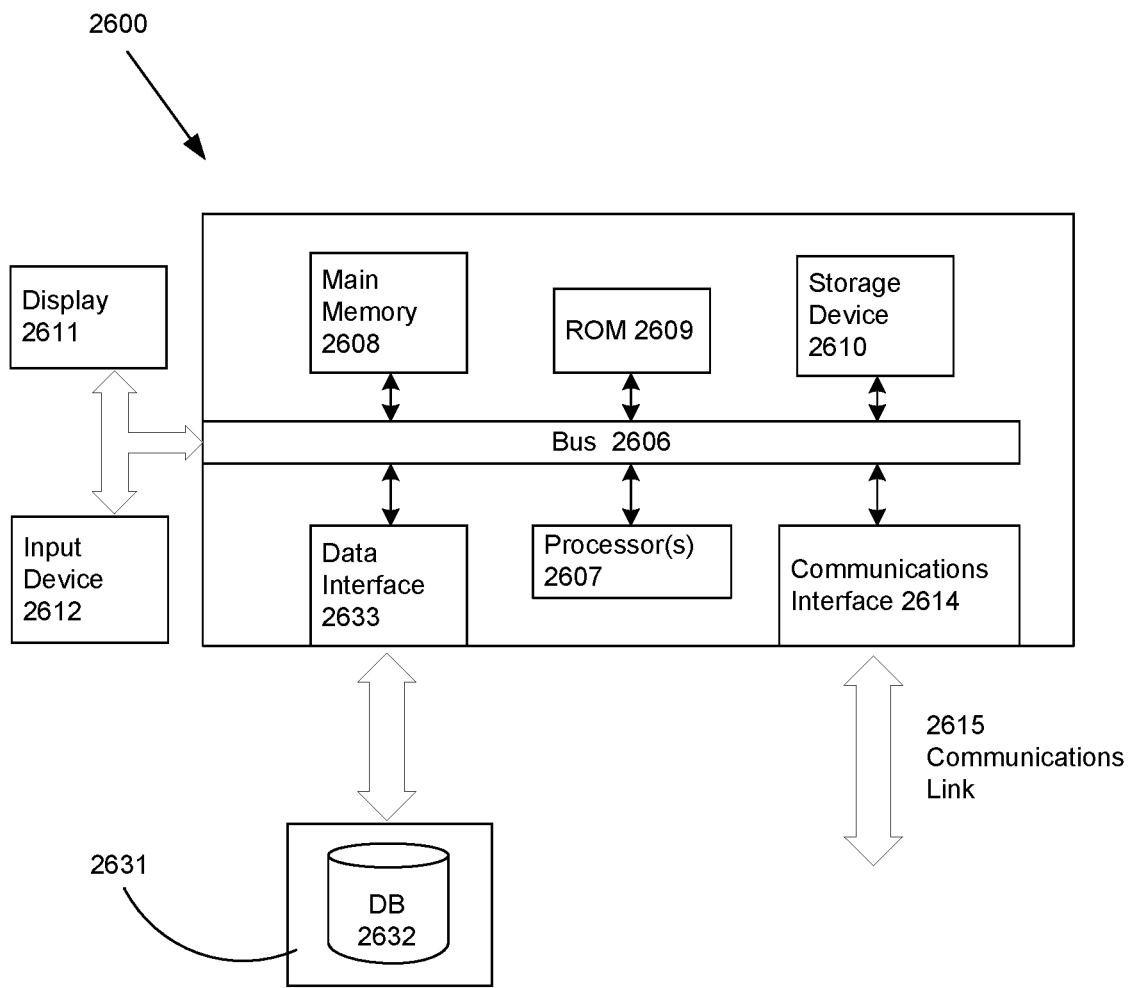

FIG. 26 depicts an embodiment of a computer system adapted and configured to implement the method of operation.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Regarding FIGS. 1-8, the figures depict the apparatus 100 comprising a chassis 101, one or more flap valve(s) 102 associated with one or more siphon pipe(s) 103, at least one guide rail 104 associated with the chassis 101, at least one actuator 105 associated with said chassis 101 and one or more support member(s) 113 adapted and configured to support the one or more siphon pipe(s) 103. In some embodiments, the apparatus 100 can comprise at least one carabiner mount 106, a pump housing 110, a solar panel 108, a tow bar 109 associated with the chassis 101, a control housing 107, wheels 111, air hose nipple(s) 112 associated with each siphon pipe 103, an attachment member 114 coupling the support member with the siphon pipes, and an adjustment element 115 associated with the solar panel 108 adapted and configured to adjust an angle of the solar panel 108 as desired. The apparatus 100 further comprises tubing 116 adapted and configured to associate a vacuum pump contained with the pump housing 110 with the siphon pipes 103 via the air hose nipple(s) 112 and, in some embodiments, quick release connections. Additionally, in some embodiments, the apparatus 100 can comprise one or more filter(s) 117 associated with one of more of the flap valve(s) 102. In some embodiments, the tow bar 109 can be coupled with the chassis 101 via a pivot connection 118. Additionally, in some embodiments the support member 113 can have one or more pivot connection(s) 118 adapted and configured to enable folding of the support member 113.

A full-scale version of this machine 100 can be built with numerous chassis 101 mainframes which can contain less than all of the components on the main chassis 101, particularly the components contained in 107 and 110, which can drastically reduce the manufacturing costs. The machine 100 can transport the siphon pipes 103 to the field location requiring irrigation and can autonomously lift and lower the siphon pipes 103 to the appropriate field section.

The machine 100 being produced is different from lateral and pivot irrigation systems in that the instant machine 100 can utilize flood irrigation techniques, not sprinkler devices. Pivot and lateral irrigation systems have a central arm that moves through the field. This machine 100 remains stationary field side atop the ditch bank and remains so until a specified section of the filed has been irrigated. Pivots and laterals also do NOT utilize siphon pipes 103 in their irrigation methods. Pivot and lateral irrigation machine have columned support wheel structures that move throughout the fields and reduce the amount of arable land. This machine's conceptualization and design was NOT based on either pivot or lateral irrigation systems.

FIG. 9 depicts an alternate embodiment of the apparatus 100 in a deployed configuration. In the embodiment depicted in FIG. 9, the apparatus 100 comprises a chassis 101 having a guide rail 104 wherein the guide rail 104 is associated with an actuator 105. The actuator 105 is coupled with at least one support member 113 which supports one or more siphon pipes 103. Each siphon pipe 103 can be associated with a pump contained within a pump housing 110. Each siphon pipe 103 can comprise a flap valve 102 and an air hose nipple 112. Tubing 116 can couple one or more air hose nipple(s) 112 with the vacuum pump contained within the pump housing 110. In some embodiments, the flap valve(s) 102 can be vacuum operated, wherein when a vacuum is applied to the siphon pipe 103 through the attachment 112, so that the flap valve will close and create a vacuum in the siphon pipe 103. However, in some embodiments, the flap valve(s) 102 can be electrically controlled and close upon application of a specified signal and/or voltage. Additionally, in some embodiments one or more of the siphon pipes 103 can comprise filter(s) 117 or screens to inhibit foreign objects from being drawn into the siphon pipe 10.

In some embodiments the apparatus 100 can comprise a control housing 107 containing components adapted and configured to control the operation of the apparatus 100. Additionally, in some embodiments the apparatus 100 can comprise one or more solar panel(s) 108 adapted and configured to at least partially contribute to the battery-powered operation of the apparatus 100.

In the embodiment depicted in FIG. 9, the support member 113 can comprise one or more siphon pipe(s) 103, raising and lowering them with the guide rails 104. Pivot connection 118 can be adapted and configured to facilitate collapse of the support member 113 of the apparatus for transportation.

In some embodiments the apparatus 100 can comprise a motor 119 coupled with a power source contained within the control housing 107. In operation the motor 119 can drive one or more of the wheels 111 to move the apparatus 100 from a first location to a second location. In some embodiments, the apparatus 100 can comprise more than one motor such that the wheels 111 can be independently driven and/or guided by automatic steering.

In some embodiments, the apparatus 100 can further comprise one or more sensor(s) 120 adapted and configured to collect readings from the soil or environment. In some embodiments the sensor(s) 120 can collect readings related to moisture content. However, in alternate embodiments, the sensor(s) 120 can collect readings related to any known, convenient and/or desired data and/or condition(s) and/or can be positioned on the apparatus 100 or in any known, convenient and/or desired location relative to the apparatus 100. The sensor(s) 120 can be in electrical communication with at least the control housing 107 and the antenna 121 facilitating communication of the readings from the sensor for analysis either via the programmable logic controller 127 (depicted in FIG. 22) or transmitted from the apparatus 100 for analysis elsewhere.

In operation, the apparatus 100 can be transported to a first location either under its own power via the motor 119 and/or manually and/or via other means. The siphon pipe(s) 103 can be lowered via the actuator 105 (using the guide rail 104) lower the support member 113. After the siphon pipes 103 are lowered into the ditches, the vacuum pump 134 (FIG. 22) can be activated and a vacuum can be applied to one or more of the siphon pipe(s) 103 via tubing 116. Application of the vacuum to the siphon pipe 103 can cause the flap valve 102 to close and create a vacuum in the siphon pipe 103. The vacuum in the siphon pipe 103 can cause water in first ditch to be drawn into the siphon pipe 103 and directed toward the air hose nipple 112 and the flap valve 102. After water flow begins, the vacuum can be dissociated with the siphon pipe 103 and water will continue to flow from the first ditch to the flap valve 102. Control of the application of the vacuum to the siphon pipe 103 can be controlled via the programmable logic controller 127 (FIG. 22) and can be based on a prescribed time period, a prescribed voltage associated with the vacuum pump 134 (FIG. 24). Application of the vacuum to each of the siphon pipe(s) 103 can be controlled via one or more solenoids 135 (FIG. 24). In some embodiments, the vacuum can be applied individually to each of the siphon pipe(s) 103. However, in alternate embodiments, the vacuum can be applied to more than one, or all, of the siphon pipes 103 simultaneously.

In some embodiments, water can continue to flow from the first ditch to the flap valve 102 in each siphon pipe 103 for a prescribed period of time and/or until the apparatus 100 is directed via the actuator 105 to raise the support member 113 and thus the siphon pipe(s) 103 as well, either manually or electronically. Upon raising the siphon pipe(s) 103 from the first ditch, water flow from the ditch via the siphon pipe 103 toward the flap valve 102 will be terminated.

In some embodiments, the sensor(s) 120 can read data and if the data indicates prescribed thresholds and/or conditions are met and upon reaching the prescribed threshold, the apparatus 100 can raise the siphon pipe(s) 103 via the actuator 105 and support member 113 from the first ditch to terminate water flow.

FIG. 10 depicts an exploded view of the apparatus 100 depicted in FIG. 9. In the embodiment depicted in FIG. 10, the apparatus 100 comprises selectively engageable coupling element(s) 122 adapted and configured to selectively secure each siphon pipe 103 to the support member 113 at any desired locations and/or spacings along the support member 113. In some embodiments, the coupling element 122 can be an adjustable and locking pipe-holding component adapted and configured to selectively engage both the siphon pipe 103 and the support member 113. However, in alternate embodiments any known, convenient and/or desired engagement mechanism and/or apparatus can be employed to selectively couple each siphon pipe 103 with the support member 113.

FIG. 11 depicts a side elevation view of the apparatus 100 depicted in FIG. 9. In the embodiments depicted in FIG. 11 the support member 113 is an a partially raised position wherein the lowest point of each siphon pipe 103 is above the lowest point of each of the wheels 111 to facilitate of movement of the apparatus 100 without dragging the siphon pipe(s) 103.

FIG. 12 depicts a top view of the apparatus 100 depicted in FIG. 9. In the embodiment depicted in FIG. 12, portions of the support member 113 can comprise a connection aperture 124 positioned and sized such that when the support member 113 is folded via the pivot connection 118 the carabiner or latching mount 106 will align and engage with the connection aperture 124 thus facilitating collapse of the apparatus 100 for transport. In operation, the support member 113 can be folded via the pivot connection 118 with or without removal of one or more of the siphon pipes 103, to reduce the overall length of the apparatus 100 for transportation. In some embodiments, folding/collapse of the apparatus 100 can be accomplished manually. However, in alternate embodiments, folding/collapse of the apparatus 100 can be accomplished via any known, convenient and/or desired mechanism and/or means.

FIG. 13 depicts an end elevation view of the apparatus 100 depicted in FIG. 9. As depicted in FIG. 13, the apparatus 100 is in a first configuration with the support member 113 and the siphon pipe(s) 103 in an elevated position relative to the wheels 111 such that when the apparatus 100 is moved the lowest point of the siphon pipe(s) 103 is above the lowest point of the wheels 111.

FIG. 14 depicts an alternate side elevation view of the apparatus 100 depicted in FIG. 9 in a partially deployed/ collapsed configuration. In the embodiment depicted in FIG. 14, the support member 113 of the apparatus 100 are depicted as partially folded via the pivot connection(s) 118.

FIGS. 15 and 16 depicts alternate side and top elevation views of the apparatus 100 depicted in FIG. 9. in a collapsed (or retracted) configuration. In the embodiment depicted in FIGS. 15 and 16, the support member 113 of the apparatus 100 are depicted as folded via the pivot connection(s) 118 such that the connection aperture(s) 124 in the support member 113 engage the carabiner mount(s) 106 such the apparatus 100 is collapsed for convenient transportation.

FIGS. 17a-17c depict alternate embodiments of the siphon pipe 103. In the embodiment depicted in FIG. 17a, the siphon pipe 103 can be comprised of three substantially linear components coupled via bends. In some embodiments the siphon pipe 103 can be cold bent and or inelastically deformed from an original geometry to create the desired geometry. However, in alternate embodiments, the siphon pipe 103 can be comprised of discreet components and/or can have a unitary composition and/or be formed with the prescribed geometry as depicted in FIGS. 17b. and 17c. Additionally, in some embodiments the air hose nipple 112 can be attached to the siphon pipe 103 after formation of the siphon pipe 103. However, in alternate embodiments the air hose nipple 112 can be formed as part of the siphon pipe 103.

In the embodiment depicted in FIG. 17b, the siphon pipe 103 can be comprised of three different components coupled via bends. In some embodiments the siphon pipe 103 can be cold bent and or inelastically deformed from an original geometry to create the desired geometry. However, in alternate embodiments, the siphon pipe 103 can be comprised of discreet components and/or can have a unitary composition and be formed with the prescribed geometry. Additionally, in some embodiments the air hose nipple 112 can be attached to the siphon pipe 103 after formation of the siphon pipe 103.

In the embodiment depicted in FIG. 17b, the siphon pipe 103 can be comprised of a smooth arc 125 and a flattened arc 126. In some embodiments the siphon pipe 103 can be cold bent and or inelastically deformed from an original geometry to create the desired geometry. However, in alternate embodiments, the siphon pipe 103 can be comprised of discreet components and/or can have a unitary composition and be formed with the prescribes geometry. Additionally, in some embodiments the air hose nipple 112 can be attached to the siphon pipe 103 after formation of the siphon pipe 103. However, in alternate embodiments the air hose nipple 112 can be formed as part of the siphon pipe 103.

In the embodiment depicted in FIG. 17c, the siphon pipe 103 can be comprised of integral smooth arcs 125. In some embodiments the siphon pipe 103 can be cold bent and or inelastically deformed from an original geometry to create the desired geometry. However, in alternate embodiments, the siphon pipe 103 can be comprised of discreet components and/or can have a unitary composition and be formed with the prescribes geometry. Additionally, in some embodiments the air hose nipple 112 can be attached to the siphon pipe 103 after formation of the siphon pipe 103. However, in alternate embodiments the air hose nipple 112 can be formed as part of the siphon pipe 103.

FIG. 18 depicts an alternate embodiment of the chassis 101 of the apparatus 100 adapted and configured to support the various components of the apparatus 100. While depicted as having a prescribed configuration, it should be understood that the depiction is exemplary only and not limiting, and the chassis 101 can be constructed having any known, convenient and/or desired geometric properties to improve robustness and/or to reduce manufacturing costs.

FIG. 19 depicts an alternate embodiment of the apparatus 100 in a deployed and lowered configuration. In the embodiment depicted in FIG. 19, the support member 113 has been lowered relative to the chassis 101 and the wheels 111 such that the lower points of the siphon pipe(s) 103 are positioned below the wheels 111 thus facilitating the siphon pipe(s) 103 to be positioned in a ditch and facilitate water flow after the vacuum pump 134 (FIG. 24) is activated.

FIG. 20 depicts a side elevation view of the apparatus 100 depicted in FIG. 19 in a deployed and lowered configuration. In the embodiment depicted in FIG. 20, the support member 113 has been lowered relative to the chassis 101 and the wheels 111 such that the lower points of the siphon pipe(s) 103 are positioned below the wheels 111 thus facilitating the siphon pipe(s) 103 to be positioned with a ditch and facilitate water flow after the vacuum pump 134 (FIG. 24) is activated.

FIG. 21 depicts an end elevation view of the apparatus 100 depicted in FIG. 19 in a deployed and lowered configuration. In the embodiment depicted in FIG. 21, the support member 113 has been lowered relative to the chassis 101 and the wheels 111 such that the lower points of the siphon pipe(s) 103 are positioned below the wheels 111 thus facilitating the siphon pipe(s) 103 to be positioned with a ditch and facilitate water flow after the vacuum pump 134 (FIG. 24) is activated.

FIG. 22 depicts an exploded view of the electrical component box 107 of the apparatus 100. In the embodiment depicted in FIG. 22, the control housing 107 can comprise an antenna 121, an interface 123 via which a user can interact with and control the apparatus 100. In the embodiment depicted in FIG. 22, the control housing 107 can further comprise a programmable logic controller 127, a battery 128, a power supply 129a, an inverter 129b (which can, in some embodiments, be combined), a solar charge controller 136, and an on/off switch 137, wherein all components in the control housing 107 can be electrically coupled via electrical connection(s) 130. As previously described, the programmable logic controller 127 can control the raising, lower of the support member 113 and control activation of the vacuum pump 134 to control water flow through the siphon pipe(s) 103. In some embodiments, the programmable logic controller 127 can further be coupled with the antenna 121 to accept electrical signals and/or instructions and/or can be in electrical communication with the one or more sensor(s) 120 to facilitate automated operation based upon readings from the sensor(s) 120.

FIG. 23 depicts an exploded view of interface components which can comprise an interface 123, a base 131 to support the interface 123 and a cover plate 132 to support the interface 123 and the base 131 within or on top of the control housing 107. In the embodiment depicted in FIG. 23, the support 132 comprises an aperture 133 such that the interface 123 can electrically communicate with the programmable logic controller 127 via one or more electrical connections 130.

FIG. 24 depicts an exploded view of the pump box 107 of the apparatus 100. In the embodiment depicted in FIG. 24, the pump housing 110 comprises a vacuum pump 134 and a plurality of solenoids 135. In some embodiments the programmable logic controller 127 can control the operation of the vacuum pump 134 and can electrically control the solenoids 135 to individually control the vacuum applied to each siphon pipe 103 via the tubing 116 and one or more electrical connections 130.

FIG. 25 depicts a method of operation of the apparatus 100. In the embodiment depicted in FIG. 25, in step 2502 a prescribed desired moisture is determined which can be set by a user for a specified crop. In step 2504 the apparatus 100 can be moved to a first location with the crop and then in step 2506 the siphon pipes 103 can be lowered such that the siphon pipe 103 are in contact with water in a first ditch and one or more sensor(s) 120 are in contact with the soil in the to-be-irrigated area.

In step 2508 a moisture reading can be obtained, then in step 2510 the moisture reading is compared to the desired moisture reading. If the moisture reading is below a desired level, then in step 2512 the vacuum pump 134 can be activated and one or more solenoids 135 can couple the vacuum from the vacuum pump 134 with one or more of the siphon pipe(s) 103 to initiate water flow through the siphon pipe(s) 103 in step 2514. In step 2516 the solenoids 135 can be disengaged based on prescribed criteria (such as a prescribed time interval and/or a prescribed voltage measure at the vacuum pump 134).

In step 2518, a moisture reading can be taken from the sensor 120 and the moisture reading compared in step 2520 to the desired moisture reading from step 2502. If the moisture reading is below the prescribed moisture reading, then the apparatus 100 can maintain position and repeat steps 2518 and 2520 at prescribed intervals until the moisture reading in comparison in step 2520 meets or exceeds the desired moisture reading identified in step 2502.

If the initial moisture reading in step 2510 and/or the moisture reading in step 2520 exceeds the prescribed moisture level from step 2502, then the siphon pipe(s) 103 can be raised in step 2524 via the actuator 105 raising the support member 113. The transport system can then be engaged in step 2526 and the apparatus 100 can move to a second prescribed location in step 2528 and the transport system disengaged in step 2530. The system can then repeat the cycle by returning to step 2506 and lowering the siphon tube(s) 103.

FIG. 26 depicts an embodiment of a computer system adapted and configured to implement the method of operation.

The execution of the sequences of instructions required to practice the embodiments can be performed by a computer system 2600 as shown in FIG. 26. In an embodiment, execution of the sequences of instructions is performed by a single computer system 2600. According to other embodiments, two or more computer systems 2600 coupled by a communication link 2615 can perform the sequence of instructions in coordination with one another. Although a description of only one computer system 2600 will be presented below, however, it should be understood that any number of computer systems 2600 can be employed to practice the embodiments.

A computer system 2600 according to an embodiment will now be described with reference to FIG. 26, which is a block diagram of the functional components of a computer system 2600. As used herein, the term computer system 2600 is broadly used to describe any computing device that can store and independently run one or more programs.

Each computer system 2600 can include a communication interface 2614 coupled to the bus 2606. The communication interface 2614 provides two-way communication between computer systems 2600. The communication interface 2614 of a respective computer system 2600 transmits and receives electrical, electromagnetic, or optical signals, that include data streams representing various types of signal information, e.g., instructions, messages, and data. A communication link 2615 links one computer system 2600 with another computer system 2600. For example, the communication link 2615 can be a LAN, in which case the communication interface 2614 can be a LAN card, or the communication link 2615 can be a PSTN, in which case the communication interface 2614 can be an integrated services digital network (ISDN) card or a modem, or the communication link 2615 can be the Internet, in which case the communication interface 2614 can be a dial-up, cable, wireless modem, or 5G satellite receiver.

A computer system 2600 can transmit and receive messages, data, and instructions, including program, i.e., application, code, through its respective communication link 2615 and communication interface 2614. Received program code can be executed by the respective processor(s) 2607 as it is received, and/or stored in the storage device 2610, or other associated non-volatile media, for later execution.

In an embodiment, the computer system 2600 operates in conjunction with a data storage system 2631, e.g., a data storage system 2631 that contains a database 2632 that is readily accessible by the computer system 2600. The computer system 2600 communicates with the data storage system 2631 through a data interface 2633. A data interface 2633, which is coupled to the bus 2606, transmits and receives electrical, electromagnetic, or optical signals, that include data streams representing various types of signal information, e.g., instructions, messages, and data. In embodiments, the functions of the data interface 2633 can be performed by the communication interface 2614.

Computer system 2600 includes a bus 2606 or other communication mechanism for communicating instructions, messages, and data, collectively, information, and one or more processors 2607 coupled with the bus 2606 for processing information. Computer system 2600 also includes a main memory 2608, such as a random-access memory (RAM) or other dynamic storage device, coupled to the bus 2606 for storing dynamic data and instructions to be executed by the processor(s) 2607. The main memory 2608 also can be used for storing temporary data, i.e., variables, or other intermediate information during execution of instructions by the processor(s) 2607.

The computer system 2600 can further include a read only memory (ROM) 2609 or other static storage device coupled to the bus 2606 for storing static data and instructions for the processor(s) 2607. A storage device 2610, such as a magnetic disk or optical disk, can also be provided and coupled to the bus 2606 for storing data and instructions for the processor(s) 2607.

A computer system 2600 can be coupled via the bus 2606 to a display device 2611, such as, but not limited to, a cathode ray tube (CRT) or a liquid-crystal display (LCD) monitor, for displaying information to a user. An input device 2612, e.g., alphanumeric, and other keys, is coupled to the bus 2606 for communicating information and command selections to the processor(s) 2607.

According to one embodiment, an individual computer system 2600 performs specific operations by their respective processor(s) 2607 executing one or more sequences of one or more instructions contained in the main memory 2608. Such instructions can be read into the main memory 2608 from another computer-usable medium, such as the ROM 2609 or the storage device 2610. Execution of the sequences of instructions contained in the main memory 2608 causes the processor(s) 2607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 2607. Such a medium can take many forms, including, but not limited to, non-volatile, volatile and transmission media. Non-volatile media, i.e., media that can retain information in the absence of power, includes the ROM 2609, CD ROM, magnetic tape, and magnetic discs. Volatile media, i.e., media that can not retain information in the absence of power, includes the main memory 2608. Transmission media includes coaxial cables, copper wire and fiber optics, including the wires that comprise the bus 2606. Transmission media can also take the form of carrier waves; i.e., electromagnetic waves that can be modulated, as in frequency, amplitude, or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high-level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM, or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. An irrigation apparatus comprising:
a chassis;
a support member coupled with said chassis;
a plurality of siphon pipes;

wherein each said siphon pipe comprises:
  a check valve at a first end; and
  an air hose nipple;
a vacuum pump mechanically coupled with each said air hose nipple;
an actuator coupled with said support member; and
a power source coupled with said vacuum pump and said actuator;
wherein each of said plurality of siphon pipes are releasably coupled with said support member and said vacuum pump; and
wherein said actuator raises and lowers said plurality of siphon pipes relative to said chassis.

2. The irrigation apparatus of claim 1 wherein said vacuum pump induces a vacuum within each of said plurality of siphon pipes.

3. The irrigation apparatus of claim 2 wherein said vacuum pump induces a prescribed vacuum pressure within each of said plurality of siphon pipes.

4. The irrigation apparatus of claim 3 comprising:
at least one sensor adapted and configured for determining moisture content;
a plurality of wheels; and
a motor coupled with at least one of said plurality of wheels;
wherein if said at least one sensor determines that moisture content exceeds a prescribed threshold, said siphon pipes are raised via said actuator;
wherein after said siphon pipes are raised via said actuator, said motor drives said at least one of said plurality of wheels moves the apparatus; and
wherein at least one of said plurality of siphon pipes has a parabolic shape.

5. The irrigation apparatus of claim 4 wherein each said air hose nipple is located on each said siphon pipe of said plurality of siphon pipes at an apex or apex region of each said siphon pipe.

6. The irrigation apparatus of claim 1 wherein each said air hose nipple is located on each said siphon pipe of said plurality of siphon pipes at an apex or apex region of each said siphon pipe.

7. The irrigation apparatus of claim 6 wherein at least one of said plurality of siphon pipes has a parabolic shape.

8. The irrigation apparatus of claim 1 comprising:
at least one sensor adapted and configured for determining moisture content;
wherein if said at least one sensor determines that moisture content exceeds a prescribed threshold, said siphon pipes are raised via said actuator.

9. The irrigation apparatus of claim 8 comprising:
a plurality of wheels; and
a motor coupled with at least one of said plurality of wheels;
wherein after said siphon pipes are raised via said actuator, said motor drives said at least one of said plurality of wheels moves the apparatus.

10. A method of irrigation comprising:
providing a chassis;
providing a support member coupled with said chassis;
providing a plurality of siphon pipes;
wherein each said siphon pipe comprises:
  a check valve at a first end; and
  an air hose nipple;
associating a vacuum pump mechanically coupled with each said air hose nipple;
providing an actuator coupled with said support member;
providing a power source coupled with said vacuum pump and said actuator;
releasably coupling each of said plurality of siphon pipes with said support member and said vacuum pump; and
operating said actuator to raises and lowers said plurality of siphon pipes relative to said chassis.

11. The method of irrigation of claim 10 comprising a vacuum within each of said plurality of siphon pipes.

12. The method of irrigation of claim 11 wherein said vacuum induces a prescribed vacuum pressure within each of said plurality of siphon pipes.

13. The method of irrigation of claim 12 comprising:
providing at least one sensor which determines a moisture content;
providing a plurality of wheels;
providing a motor coupled with at least one of said plurality of wheels;
determining whether said moisture content exceeds a prescribed threshold; and
raising said plurality of siphon pipes via said actuator if said moisture content exceeds said prescribed threshold;
wherein at least one of said plurality of siphon pipes has a parabolic shape.

14. The irrigation apparatus of claim 13 wherein each said air hose nipple is located on each said siphon pipe of said plurality of siphon pipes at an apex or apex region of each said siphon pipe.

15. The method of irrigation of claim 10 wherein each said air hose nipple is located on each said siphon pipe of said plurality of siphon pipes at an apex or apex region of each said siphon pipe.

16. The method of irrigation of claim 15 wherein at least one of said plurality of siphon pipes has a parabolic shape.

17. The method of irrigation of claim 10 comprising:
determining, via at least one sensor, whether said moisture content exceeds a prescribed threshold; and
raising said siphon pipes via said actuator if said moisture content exceeds said prescribed threshold.

18. The method of irrigation of claim 17 comprising:
providing a plurality of wheels;
providing a motor coupled with at least one of said plurality of wheels; and
driving at least one of said plurality of wheels after said siphon pipes are raised via said actuator moves a position of said siphon pipes.

* * * * *